United States Patent [19]
Nuyts

[11] Patent Number: 5,344,272
[45] Date of Patent: Sep. 6, 1994

[54] MEANS OF TRANSPORT SUCH AS A GARBAGE TRUCK OR SUCH LIKE, PROVIDED WITH A LOADING AND TILTING DEVICE FOR THE HANDLING OF CONTAINERS OR SUCH LIKE

[75] Inventor: Henry Nuyts, Turnhout, Belgium

[73] Assignee: NV Nuyts ORB, Oud-Turnhout, Belgium

[21] Appl. No.: 783,671

[22] Filed: Oct. 29, 1991

[30] Foreign Application Priority Data

Oct. 30, 1990 [NL] Netherlands .......................... 9002352
Jul. 8, 1991 [NL] Netherlands .......................... 9101192

[51] Int. Cl.$^5$ ............................................. B65F 3/02
[52] U.S. Cl. .................................... 414/408; 414/420; 414/21; 414/409; 414/421; 414/406; 177/139; 177/147
[58] Field of Search ............... 414/487, 408, 409, 403, 414/406, 407, 419, 420, 421, 422, 425, 546, 486, 21, 640, 641, 642; 298/11; 177/139, 136, 145, 147

[56] References Cited

U.S. PATENT DOCUMENTS

| | | | |
|---|---|---|---|
| 3,307,724 | 3/1967 | Miller | 414/420 |
| 3,472,404 | 10/1969 | Ord | 414/420 |
| 3,902,616 | 9/1975 | Santic et al. | 414/420 |
| 4,645,018 | 2/1987 | Garbade et al. | 177/6 |
| 4,714,122 | 12/1987 | Appleton et al. | 177/139 |
| 4,771,837 | 9/1988 | Appleton et al. | 177/139 |
| 4,824,315 | 4/1989 | Naab et al. | 414/408 |
| 5,004,392 | 4/1991 | Naab | 414/406 X |

FOREIGN PATENT DOCUMENTS

| | | | |
|---|---|---|---|
| 0292866 | 11/1988 | European Pat. Off. | 414/420 |
| 3335288 | 5/1984 | Fed. Rep. of Germany . | |
| 3903592 | 8/1990 | Fed. Rep. of Germany . | |
| 2618393 | 1/1989 | France | 414/408 |
| 1337321 | 9/1987 | U.S.S.R. | 414/408 |
| 769795 | 3/1957 | United Kingdom | 414/420 |
| 1203338 | 8/1970 | United Kingdom | 414/420 |

*Primary Examiner*—Frank E. Werner
*Attorney, Agent, or Firm*—Foley & Lardner

[57] ABSTRACT

A transporter, such as a garbage truck, a forklift truck, an exchangeable trough for a truck or the like, is provided with a loading and tilting mechanism which is slidingly, rollingly or pivotably connected with the transporter for lifting a container or the like and emptying it in the transporter or another transporter. The loading and tilting mechanism includes engaging members which are mounted on an auxiliary frame which, by means of at least two coupling members, is connected with a main frame. The main frame is supported by the transporter or is part of it. In the coupling members, a device is present for measuring the load exerted on the coupling members so that a container supported by the auxiliary frame can be weighed.

19 Claims, 31 Drawing Sheets

MEANS OF TRANSPORT SUCH AS A GARBAGE TRUCK OR SUCH LIKE, PROVIDED WITH A LOADING AND TILTING DEVICE FOR THE HANDLING OF CONTAINERS OR SUCH LIKE

BACKGROUND OF THE INVENTION

The invention relates to a means of transport such as a garbage truck, a forklift truck, an exchangeable charging trough for a truck or the like, that is provided with a loading and tilting device, which is slidingly, rollingly or pivotably connected with the means of transport for lifting a container or the like, or for loading or emptying it into or onto this or another means of transport. The loading and tilting device includes engaging members, that can cooperate with attaching members or attaching surfaces mounted laterally to the container. There is enough space present in or along the loading and tilting device so that it is able to engage the container laterally.

With the ever increasing amount of waste being transported it is desirable to weigh the amount of waste present for processing by a certain business, person or authority, so that the requirement of the polluter pays can be met.

With that, it is not feasible to drive every container having waste to a weighing bridge, so that other possibilities for weighing the waste have been sought.

SUMMARY OF THE INVENTION

In this connection, the invention provides for a vehicle of the above-mentioned type, which is characterized in that the engaging members have been mounted on an auxiliary frame connected to the main frame by means of at least two coupling members in which means have been provided for measuring the load exerted on the relevant coupling members and going in one direction, in such a way that the weight of a lifted container can be determined and in which these coupling members have been connected with the auxiliary frame outside of the space between the lines of force going through the points of action of the engaging members, which forces are produced by the weight of the load and in which the auxiliary frame together with the container constitutes the load and the main frame can be part of the vehicle, of the loading and tilting mechanism or of the engaging members.

In this way, it can be achieved that the container is weighed immediately after it is lifted and naturally means can be present for recording the weight of the container, together with a possible indication of the container itself.

As appears from the above-mentioned description, a device according to the invention can be mounted on various means of transport. The term "container" should be broadly explained and can also refer to various other objects of which the weight is to be determined.

The engaging members of the loading and tilting mechanism need not be at a fixed distance from each other, but they can be movable towards each other and away from each other, such as for example by means of hydraulic cilinders. Because of this, the device can be adapted for containers or the like having various dimensions.

According to the invention one employs an auxiliary frame which is connected with a main frame by means of coupling members. The connection between the coupling members and both frames will be such, that the coupling members are always loaded in one certain direction, so that the force exerted thereon can be measured accurately. The weight of the container can then be derived from the measured forces. Naturally, in determining the weight of the container, account must be taken of the weight of the auxiliary frame, which weight will have to be substracted from the total determined weight. When only the weight of the contents of the container has to be determined, account will have to be taken of the weight of the container itself. When the container is emptied directly, as it happens in the case where the means of transport is a garbage truck, weighing can take place for example before and after emptying the container, so that the weight of the contents of the container can be determined by simply substracting the obtained weights.

According to a development of the invention it can be provided for, that the auxiliary frame constitutes the loading and tilting mechanism and has been connected with the main frame by means of coupling members, which main frame constitutes the basis of the loading and tilting mechanism or of the means of transport or is part thereof and at which the auxiliary frame in its coupling to the main frame guarantees the loading and tilting functions of the engaging members fixed thereto.

Owing to this, it can be provided for, that the device according to the invention can be adjusted to the design of the means of transport. Therefore, weighing of a container can take place there where constructively this can be best realized, so there where constructively speaking the main frame ends and the auxiliary frame begins.

According to a development of the invention both the main frame and the auxiliary frame can constitute the lifting mechanism or be part of it, while the tilting function has been incorporated in the auxiliary frame in that the engaging members have been placed on a tilting frame which is part of the auxiliary frame. The tilting frame at the side of the vehicle is pivotally connected with the auxiliary frame to be able to carry out a tilting movement without the main and the auxiliary frame having to follow this movement.

With that, it can further be provided for, that the tilting frame is supported during its tilting movement from the main frame, in that the auxiliary frame is positioned in relation to the main frame.

Positioning can consist of a locking, which can take place by mechanical, hydraulic or pneumatic means or by means of a cam on the tilting frame. By establishing a connection between the main and auxiliary frames during the tilting movement of the tilting frame, the container can be brought into the correct position in relation to the vehicle and the means for measuring the force exerted on the coupling members can be relieved during tilting of the tilting frame.

A further possibility consists therein, in that both the main frame and the auxiliary frame constitute the lifting mechanism or are part of it, while the engaging members have been placed on a tilting frame, which, at the side of the vehicle, has been connected pivoting one-sidedly to the main frame for being able to carry out a tilting movement without the main frame or the auxiliary frame having to follow this movement. The tilting frame in its tilting movement takes along the container to be tilted from the auxiliary frame by engaging members mounted supplementary to the container.

According to a development of the invention it can also be provided for, that the main frame together with the auxiliary frame constitutes a weighing frame, which is connected with an extra lifting mechanism, which is slidingly, rollingly or pivotally connected to the means of transport, the weighing frame, in the lowermost position of the loading and tilting mechanism, gripping U-shaped around the engaging members of the loading and tilting mechanism for being able to lift a container to be tilted, whereupon the container can be lifted from the ground by an extra lifting mechanism so that it can be weighed before the loading and tilting mechanism, which takes over the container, becomes operative.

In this way, the part of the weighing device protruding behind the vehicle can be made shorter or the container can be emptied on a position located higher in the vehicle.

The U-shaped weighing frame can be U-shaped in plan view and so can be substantially in a horizontal plane. However, it can also, looked upon in side view, be U-shaped, the body of the U being the closest to the ground. In general, the weighing frame will then consist of two substantially U-shaped parts, which are connected with each other by one or more horizontally extending parts.

With that, the U-shaped weighing frame can be placed around more than one loading and tilting mechanism. These mechanisms can cooperate in order to tilt one large container, yet will also be able to tilt separate small containers. In this latter case, in weighing, intermediate parts are fitted which are fixedly connected with the auxiliary frame and which have engaging members for being able to engage the smaller containers during weighing.

The weighing frame concerned can be pivotally mounted to the vehicle or to the loading and tilting mechanism for being able to be folded underneath or against the vehicle during running of the vehicle.

According to a development of the invention it can be provided for, that the coupling members are not rigidly connected with the parts to be coupled, namely, the main frame and the auxiliary frame, since they have flexible construction or because they have a cardan-type attachment, contact or suspension in the connecting points with the parts to be coupled.

Through this it is achieved, that weighing takes place as accurately as possible, because no stresses or forces are exerted on the coupling members, by which the operation of the coupling members and therefore measurement of the forces exerted thereon would be adversely affected.

In a rigid connection of the coupling members with the main frame and the auxiliary frame, lateral forces, forces which are hard to measure or variable forces could act, such as those associated with the expanding or contracting of the auxiliary frame or the main frame or by small inaccuracies in its structure. By a flexible or cardan-type connection the influence of such forces can be removed.

According to a possible embodiment of the invention, the auxiliary frame consists of a U-shaped frame which can be brought around a container and on which the engaging members have been mounted in predetermined positions at the inside of the U-shape, which engaging members can engage a container laterally.

Such a U-shaped frame will be necessary when the container is engaged at both sides at the same time. Since here the auxiliary frame can not be brought over the container from above, it should be provided with an opening at one side, so that the container can be brought into this opening laterally.

With that, it can be provided for, that in the weighing position the U-shaped auxiliary frame forms an angle of 0° to 45° with the horizontal.

It will be obvious, that the free ends of the legs of the U could be connected with each other by providing these ends with beams projecting upwards of which the upper ends are connected by a horizontal beam. Seen in plan view, then a rectangular framework is obtained and if desired, the beam of the frame running parallel to the mounted beam could be left out. By connecting the ends at height space is being provided for letting a container through.

Since at the beginning of the weighing process the container should be engaged at two sides, the auxiliary frame will be in an approximately horizontal position. For emptying the container, such as it will happen in general, the auxiliary frame will in most cases be tilted together with the main frame. As long as the angle, over which it is being tilted, remains within a certain value, weighing of the container can still take place.

According to another development of the invention it can be provided for, that the auxiliary frame consists of an almost rectangular frame, which is provided with the engaging members on its outside, which can engage a container laterally.

In this embodiment, the container will be engaged laterally on one side and the auxiliary frame need not extend along the container but should be outside thereof. Owing to this, the frame can be completely closed.

Since here the container is engaged at one side and there will not be enough space between the engaging members and the loading and tilting mechanism in the horizontal plane, according to the invention it will be provided for, that in weighing position, the rectangular auxiliary frame forms an angle of 0° to 45° with the vertical.

According to a development of the invention it will be provided for, that the center of gravity will be within the space or the plane between the lines of force of the load produced by the weight of the hanging load and going through the connecting points between the coupling members and the auxiliary frame, at which a counterweight can be present for bringing the center of gravity withing the space. Here, the center of gravity of the mass of the auxiliary frame and of the engaged container is considered to be the center of gravity of the load. When a container is engaged balancing, then its weight will only be sensed in the engaging points of the engaging members.

When for constructive or practical reasons the container has to be engaged outside of the afore-mentioned space, according to the invention it can be provided for, that the center of gravity of the load is outside of the space or the plane between the lines of force of the load produced by the hanging load and going through the connecting points between the coupling members and the auxiliary frame, a tilting tendency of the auxiliary frame being generated by action of the weight of the load, supported in the connecting points being the closest to the load between the coupling members and the auxiliary frame and counteracted in the other connecting points between the oppositely directed coupling members and the auxiliary frame.

When here a tensile force is exerted on the coupling members being the closest to the load, both a pressure force and a tensile force can be exerted on the other coupling members. The last situation is also the case when a pressure force is exerted on the coupling members being the closest to the load.

According to an embodiment of the invention it can be provided for, that all engaging points are almost on one straight line, with the container in the weighing position not being supported in any other way and having been suspended balancing in the engaging points.

With this, the center of gravity of the container, after suspending it balancing, will be on a vertical line going through the afore-mentioned straight line and the weight of the container will affect the situation of the center of gravity of the auxiliary frame. The place where the center of gravity of the auxiliary frame will come to lie after engagement of the container, will then become the actual center of gravity of the load.

According to a further development it can be provided for, that all engaging points, all connecting points between coupling members and the auxiliary frame and the center of gravity of the auxiliary frame will be almost in one plane and at which the force only needs to be measured in some of the coupling members, the sum of the measured forces always being proportional to the weight of the engaged container for determining the weight of the container.

Due to this, determining the weight of the engaged container can take place in a simple way.

Under certain circumstances, determining the weight of an engaged container can be simplified still further by providing for, that the center of gravity of the auxiliary frame, all engaging points and the connecting points of at least two coupling members with the auxiliary frame are almost on one straight line and the auxiliary frame being pivotable around a shaft the axis of which coincides with the afore-mentioned straight line so that it can be arranged in a weighable position in several positions around said shaft, and at which the force is measured in said coupling members exclusively in order to be able to determine the weight of the engaged container.

Here, certain coupling members can be designed such that the force exerted on them need not be measured, whereas still the weight of the engaged container can be determined in the correct way.

In general it can further be noted, that for determining the weight of the engaged container, one measures the force which is exerted on each of the coupling members in a certain direction. With that, the force measurement need not take place in the direction of the vertical line. When the line of force, according to which one measures, deviates from the vertical line, under certain circumstances means for being able to determine the weight of an engaged container have to be applied. For example, this can be measuring the grade of deviation from the line going through the fastening points of the coupling members to the main frame and the auxiliary frame in relation to the vertical line.

BRIEF DESCRIPTION OF THE DRAWINGS

The invention is further explained by means of embodiments, illustrated in the drawing, wherein.

DETAILED DESCRIPTION OF THE PREFERRED EMBODIMENTS

In the figures, corresponding parts have been indicated with the same reference numbers where possible, though the embodiments of the parts can show differences.

Figure 1:
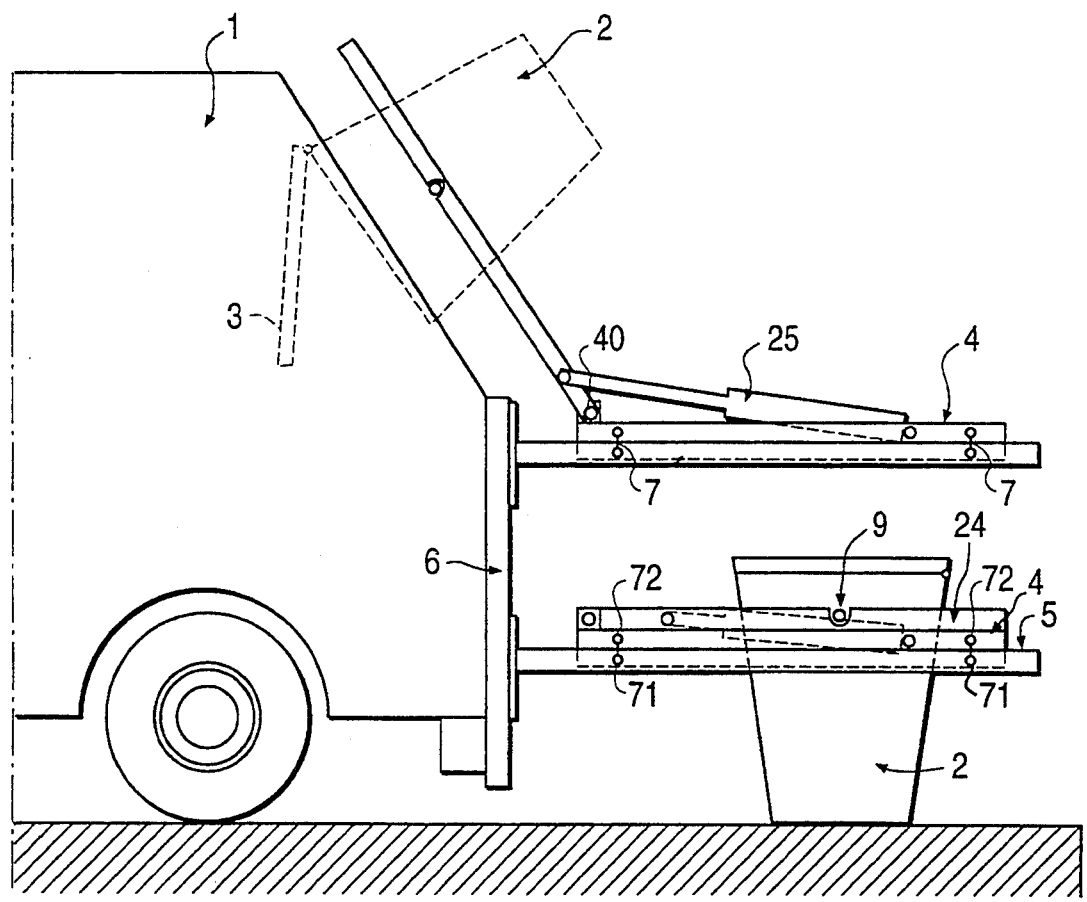
FIG. 1 diagrammatically shows a side view of a part of a vehicle provided with a weighing device according to the invention and that in two different positions thereof.

FIG. 1 shows a part of a means of transport 1 provided with a loading and tilting mechanism 6 comprising a main frame 5, which has been connected with an auxiliary frame 4 by means of coupling members 7. The main frame 5 is movable in almost vertical direction along the guides 26. As appears from FIG. 1A, both frames 4 and 5 are substantially U-shaped. The legs of the auxiliary frame 4 are connected with each other by means of the connecting piece 18. By such a construction, an unobstructed tilting of the container 2 can be achieved as well as an unobstructed falling open of the cover 3 of the container 2.

With the auxiliary frame 4, the likewise U-shaped tilting frame 24 has been connected, such that in relation thereto it is pivotable around the pivot shaft 40. The tilting frame 24 can be pivoted by means of the pressurized medium cylinder 25.

A container 2 has been provided with attaching members 11, which can cooperate with the engaging members 9 of the auxiliary frame 4.

In the lowermost position of the main frame 5, indicated in FIG. 1, a container 2 can be received in the device. Then the main frame 5 is moved into the uppermost position so that weighing of the container 2 together with auxiliary frame 4 and tilting frame 24 can take place. After this has occurred, the container can be emptied by operation of the pressurized medium cylinder 25. After bringing cylinder 25 back to its original position, a weighing can take place again, so that the weight of the garbage that was inside the container 2 can be determined.

Weighing takes place by means that have been mounted in the coupling members 7, which have been connected with the points 71 and 72.

In order to prevent loading of the coupling members 7 during emptying of the container 2, means can be present by which during this emptying the auxiliary frame 4 is locked in relation to the main frame 5.

Figure 1A:
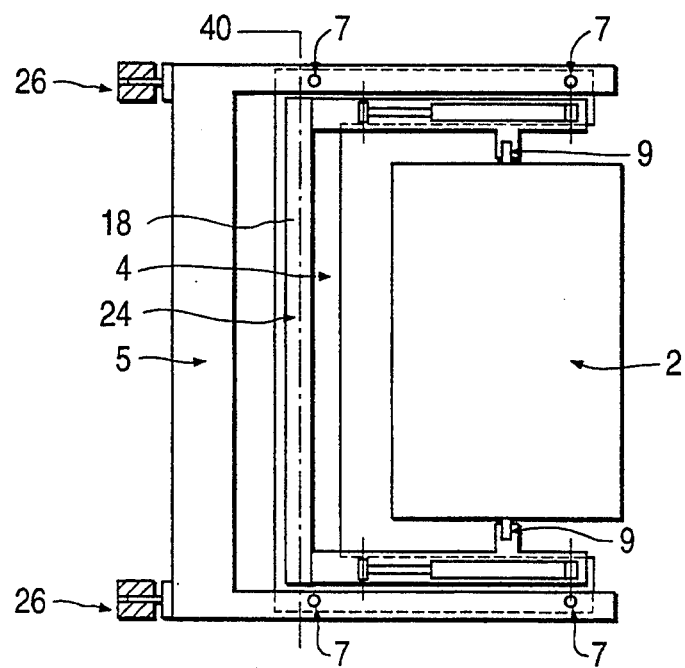
FIG. 1A shows a plan view of a part of FIG. 1.
Figure 2:
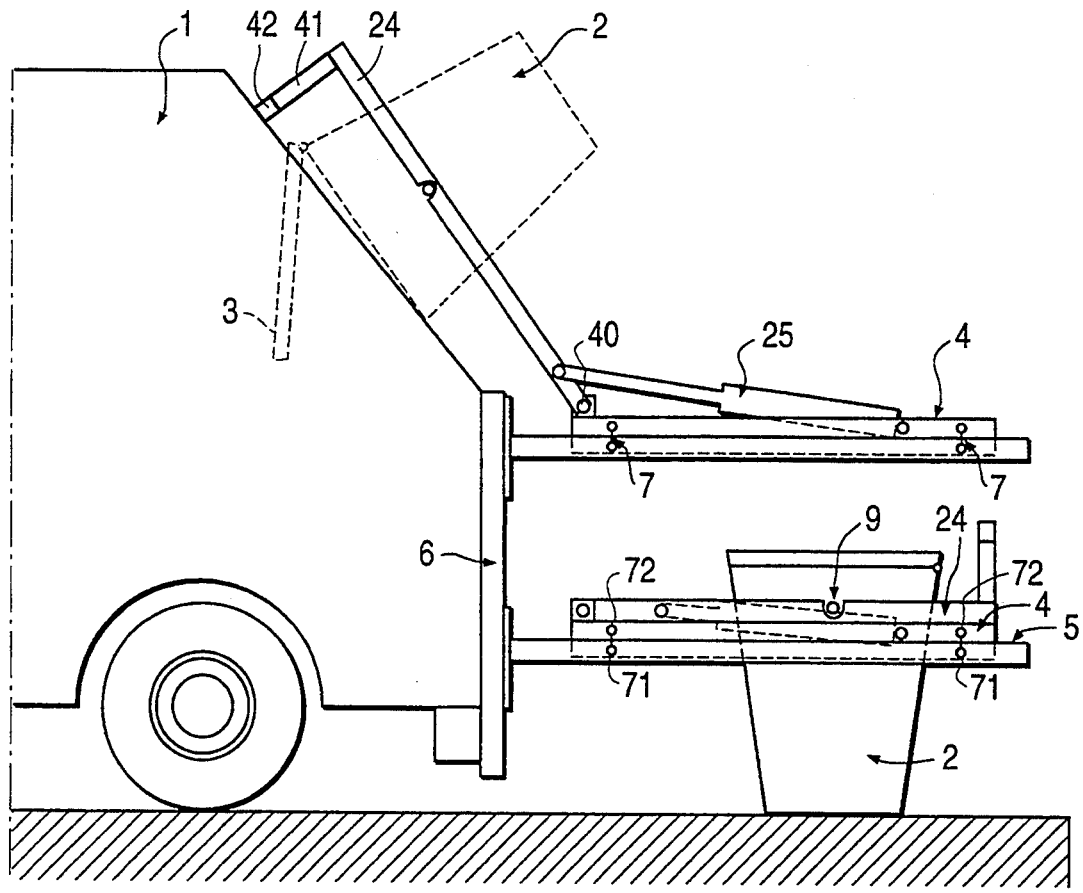
FIG. 2 shows a side view corresponding to FIG. 1, yet of another embodiment.
Figure 2A:
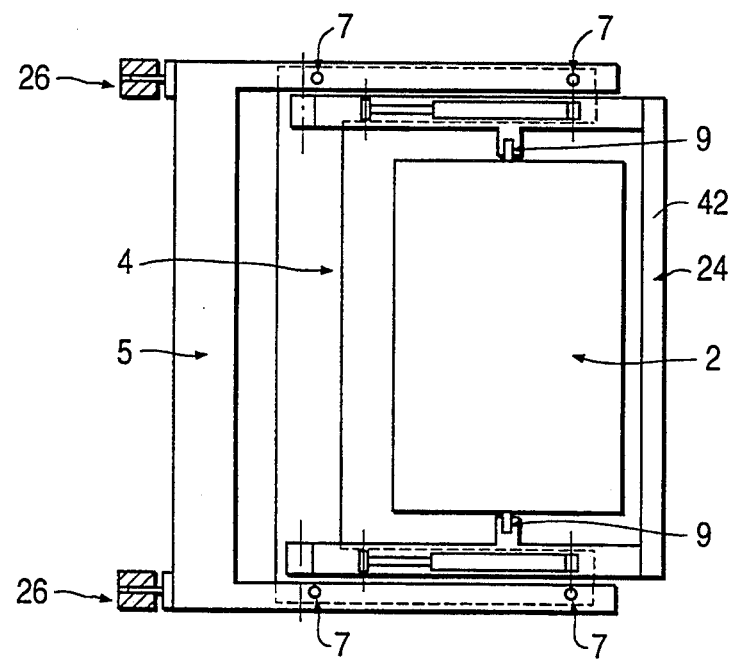
FIG. 2A shows a plan view of a part of FIG. 2.

The device according to FIGS. 2 and 2A corresponds largely to that according to FIGS. 1, 1A. Only here, at its outermost end the auxiliary frame 4 has been provided with beams 41 projecting upwards, which are connected with each other by a horizontal beam 42, so that a portal is formed through which a container 2 can brought into the device.

Figure 3:
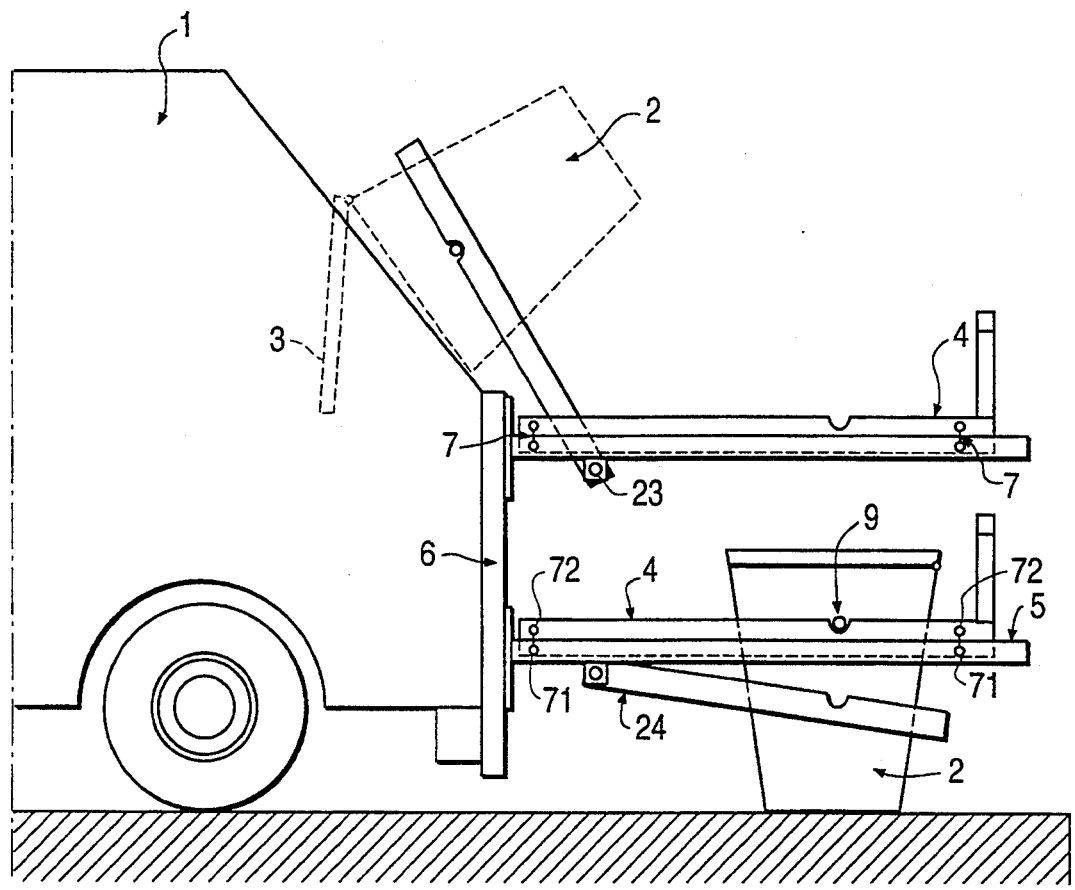
FIG. 3 shows a side view corresponding to FIG. 1, yet of a further embodiment.
Figure 3A:
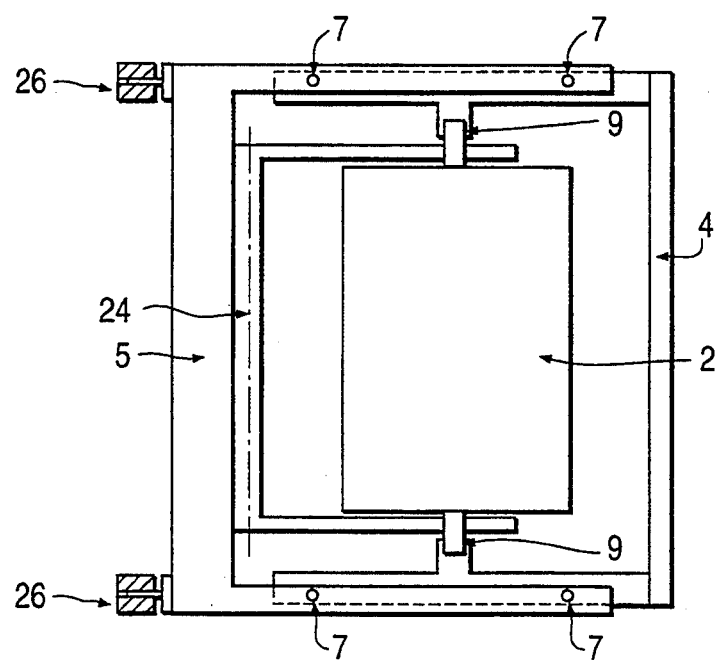
FIG. 3A shows a plan view of a part of FIG. 3.

In the embodiment according to the FIGS. 3 and 3A, the tilting frame 24 according to the axis 40 is pivotally connected with the main frame 5 and only serves for emptying a container 2 after weighing it and placing it back onto the auxiliary frame 4 again. Thus, during the tilting movement the auxiliary frame 4 is not loaded.

Due to the balanced suspension of the container 2 at the engaging members 9, which can be in the same plane as the center of gravity of the auxiliary frame 4, the distribution of the weight of the container 2 over the coupling members 7 at both sides of the line going through the engaging members 9 remains the same, even with a somewhat oblique position of the main frame 5 and the auxiliary frame 4. Because of this, it is sufficient to measure the force in the coupling members 7 at only one side of said line for determining the weight in a correct way.

Since the container 2 has been suspended in only two engaging members 9 and can balance freely with lifting it, the center of gravity of the load in the weighing position is always in the space between the lines of force going through the fastening points 71 and 72 between the coupling members 7 and the main frame 5 and the auxiliary frame 4 respectively.

Figure 4:
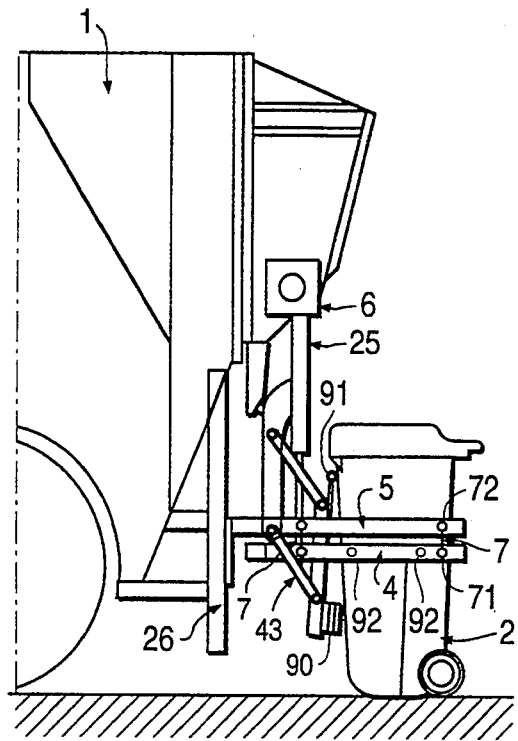
FIG. 4 shows a side view corresponding to FIG. 1, yet of a following embodiment.
Figure 4A:
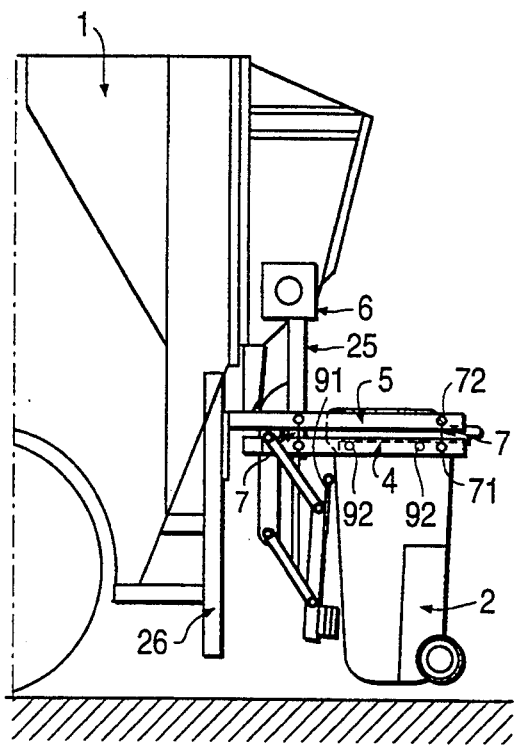
FIGS. 4A–4C show side views of the device of FIG. 4 in various operating positions thereof.
Figure 4B:
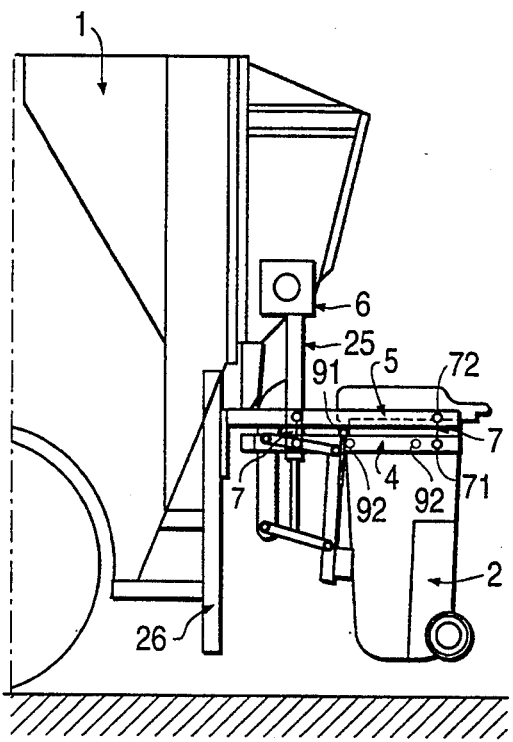
Figure 4C:
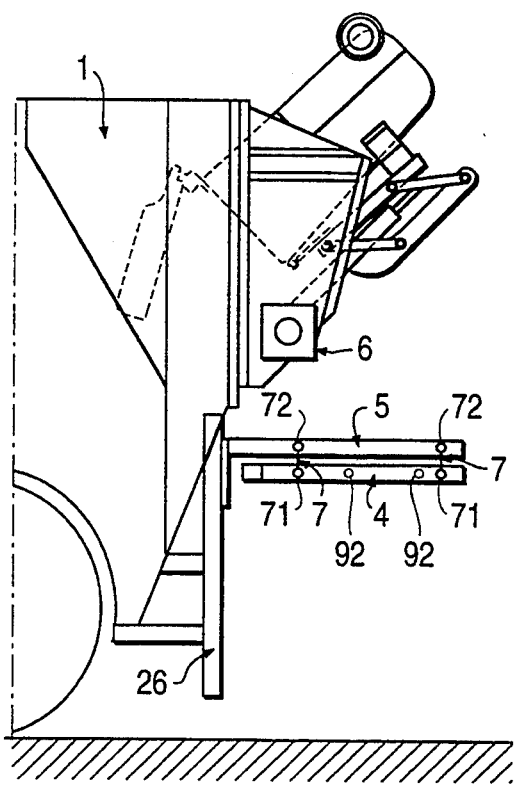

The FIGS. 4 to 4C show a device in which the main frame 5 is again vertically movable along the guides 26. Weighing of a container 2 occurs in the way described above by means of the auxiliary frame 4 and the coupling members 7. At that, the container 2 is suspended in the points 92. During the weighing, the container is completely free of the tilting mechanism 43 of which the structure corresponds to that of the structures already applied. Operation of the tilting mechanism again takes place with the help of the pressure medium cylinder 25. In using the tilting mechanism 43, its part 91 is brought into a corresponding part of the container. At the bottom, the mechanism 43 has been provided with a support 90, which also can cooperate with the container 2 in tilting it.

Figure 5:
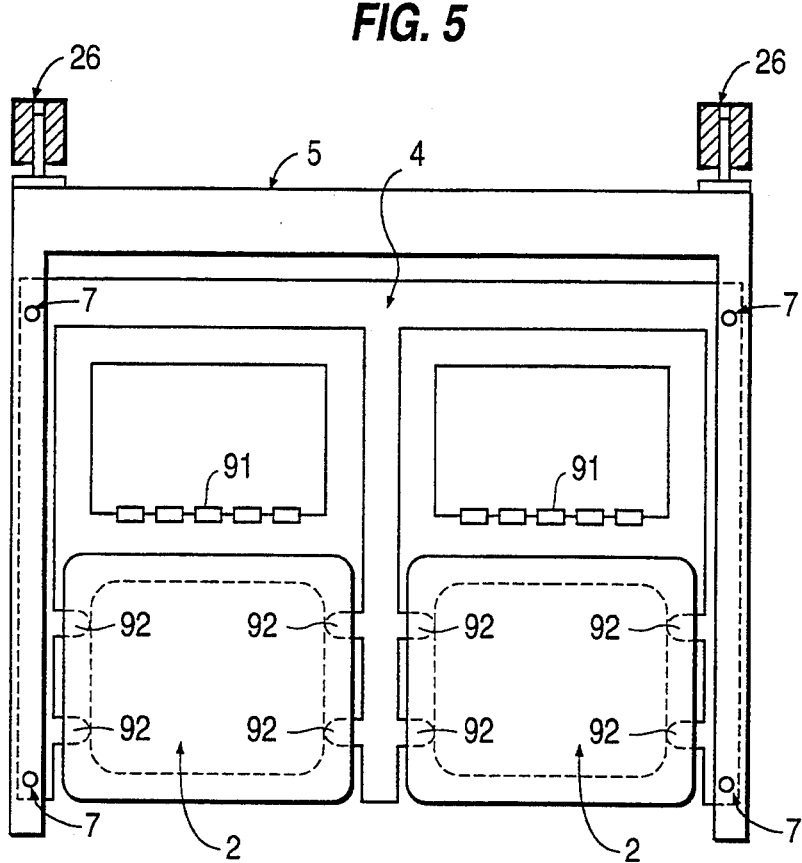
FIG. 5 diagrammatically shows a plan view of the device of FIG. 4 for simultaneous weighing of two containers.

FIG. 5 indicates how with a device as shown in FIG. 4 two containers 2 can be taken up and be weighed simultaneously before and after emptying them. With the arrangement according to FIG. 6 however, the containers 2 can be weighed separately.

Figure 7:
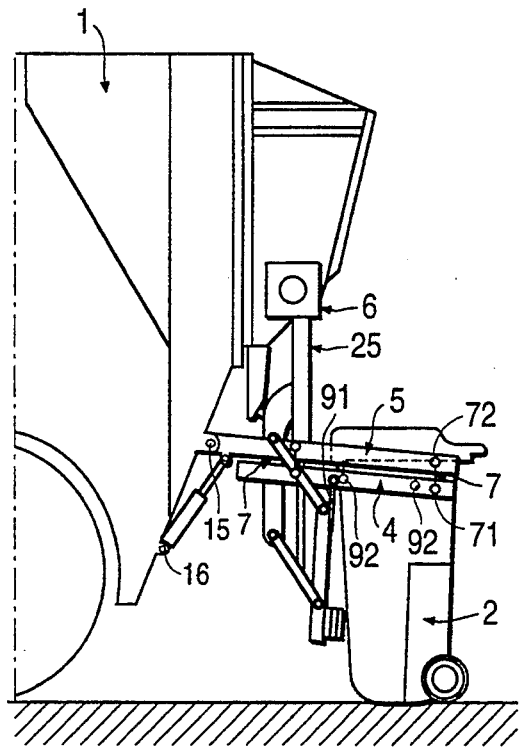
FIG. 7 shows a side view corresponding to FIG. 4, yet of an in relation thereto slightly modified embodiment.
Figure 7A:
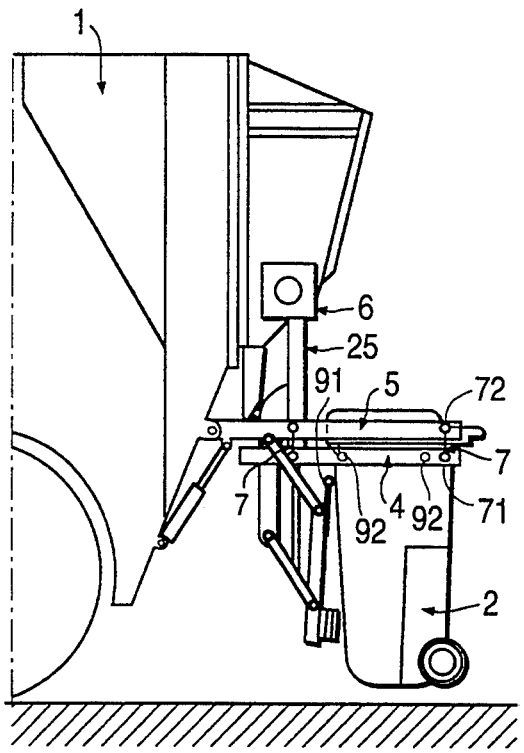
FIGS. 7A–7C show side views of the device of FIG. 7 in various operating positions thereof.
Figure 7B:
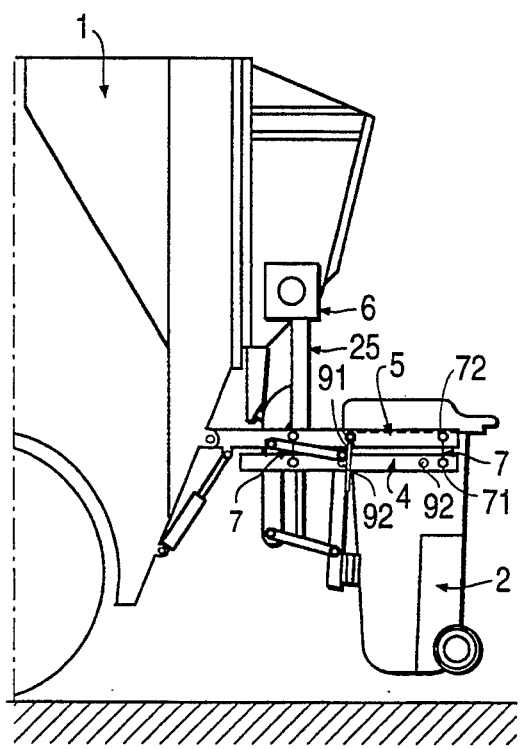
Figure 7C:
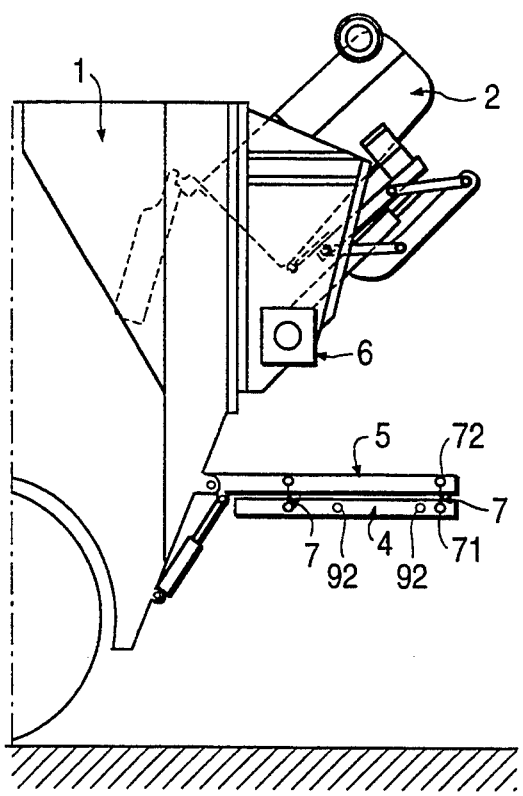

The FIGS. 7 to 7C show a device in which the main frame 5 is not movable in the vertical direction, but has been pivotally connected with the vehicle according to the pivot shaft 15. Pivoting of the main frame 5 can take place with the help of the cylinder 16. In FIG. 7A it has been indicated, that a container 2 has been slightly lifted so that its weighing can take place. In emptying the container 2, it is completely free of the auxiliary and main frame so that the coupling members 7 are not loaded.

Figure 6:
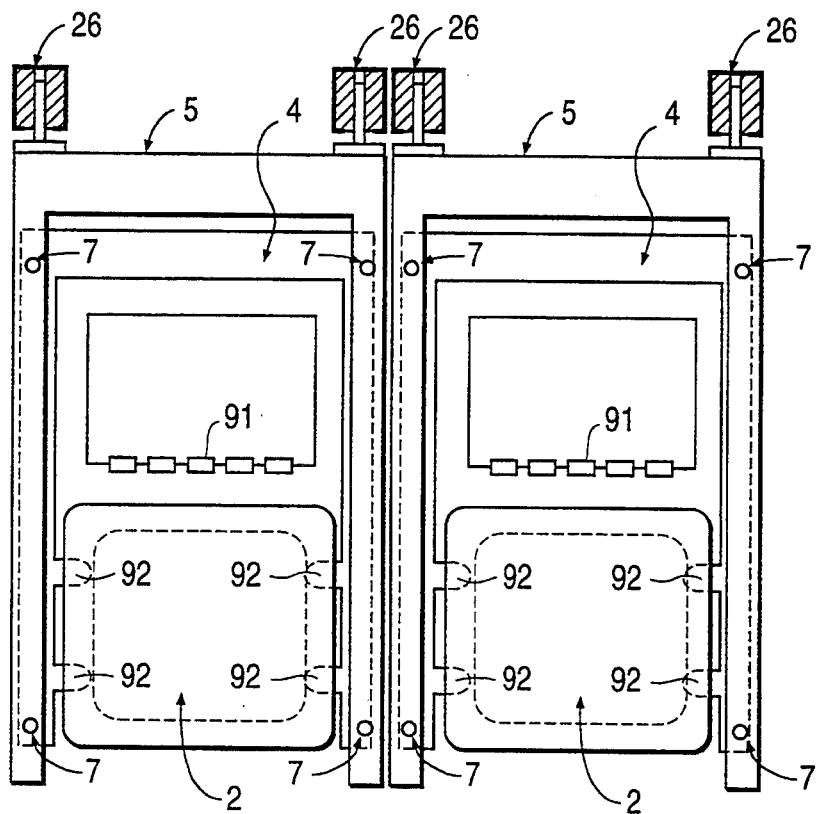
FIG. 6 shows a plan view corresponding to FIG. 5, yet in which the device is suitable for separately weighing two containers placed adjacent each other.
Figure 9:
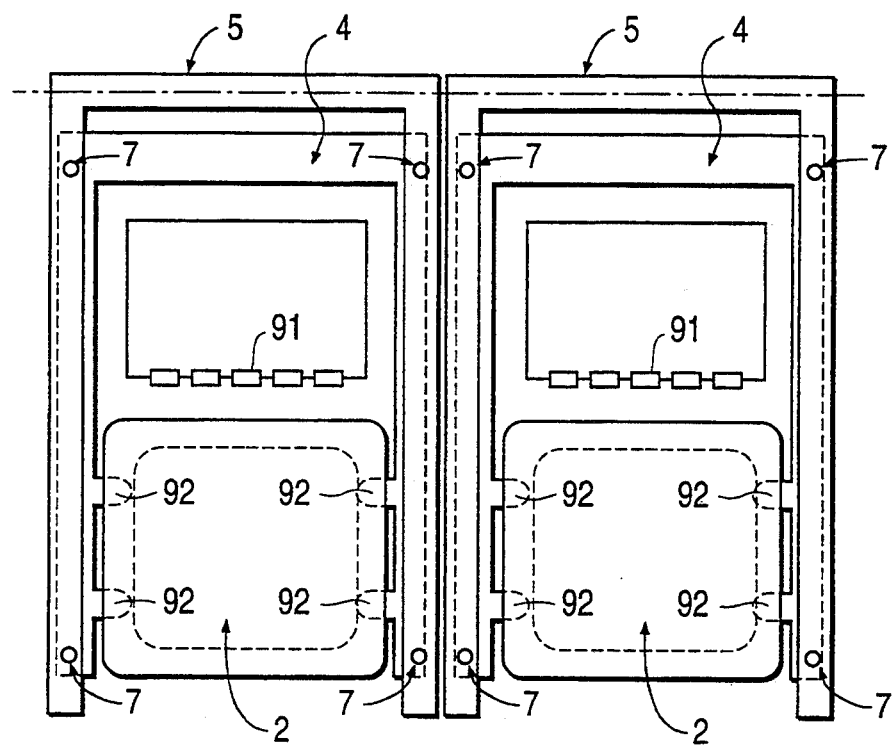
FIG. 9 shows a plan view corresponding to FIG. 8, yet in which the device is suitable for separately weighing two containers placed adjacent each other.
Figure 8:
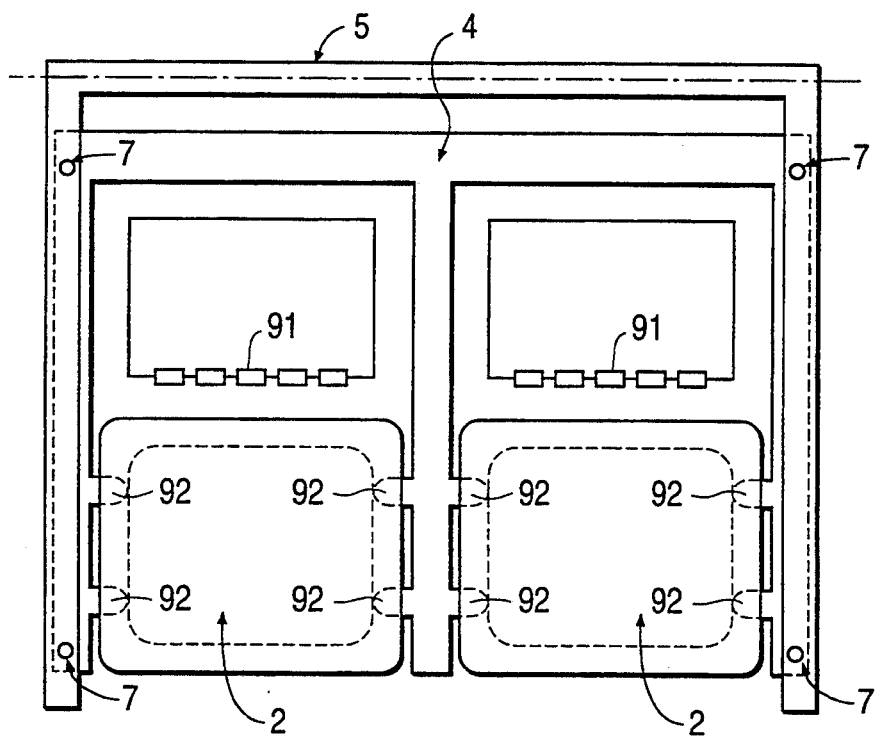
FIG. 8 diagrammatically shows a plan view of a device according to FIG. 7 for simultaneous weighing of two containers.

The FIGS. 8 and 9 substantially correspond to the FIGS. 5 and 6 respectively so that further explanation of these figs. is considered superfluous.

Figure 10:
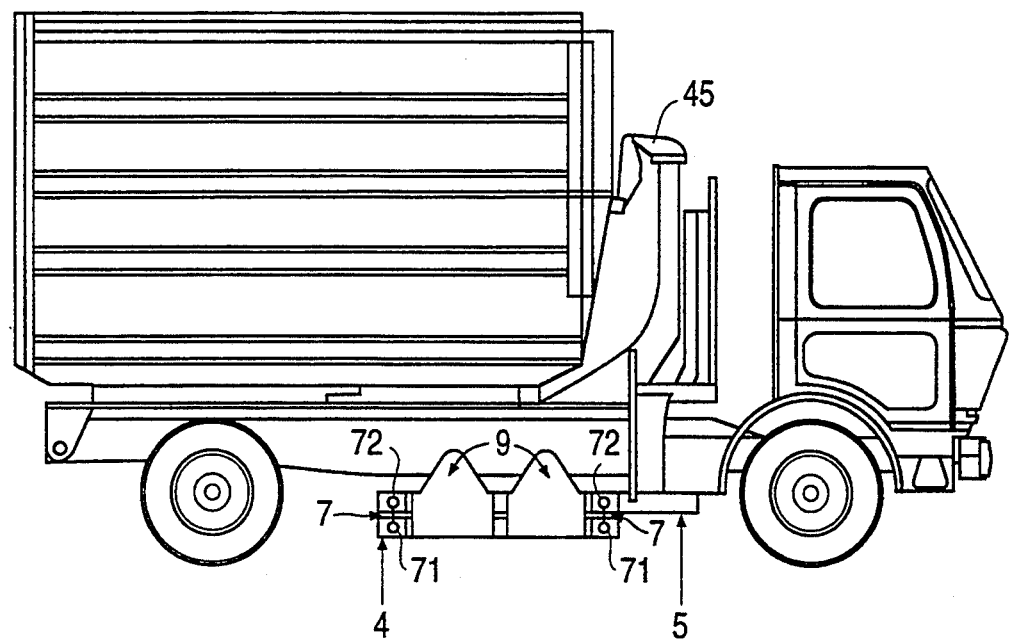
FIG. 10 shows a side view of a vehicle with a device according to a further embodiment mounted thereto.
Figure 10A:
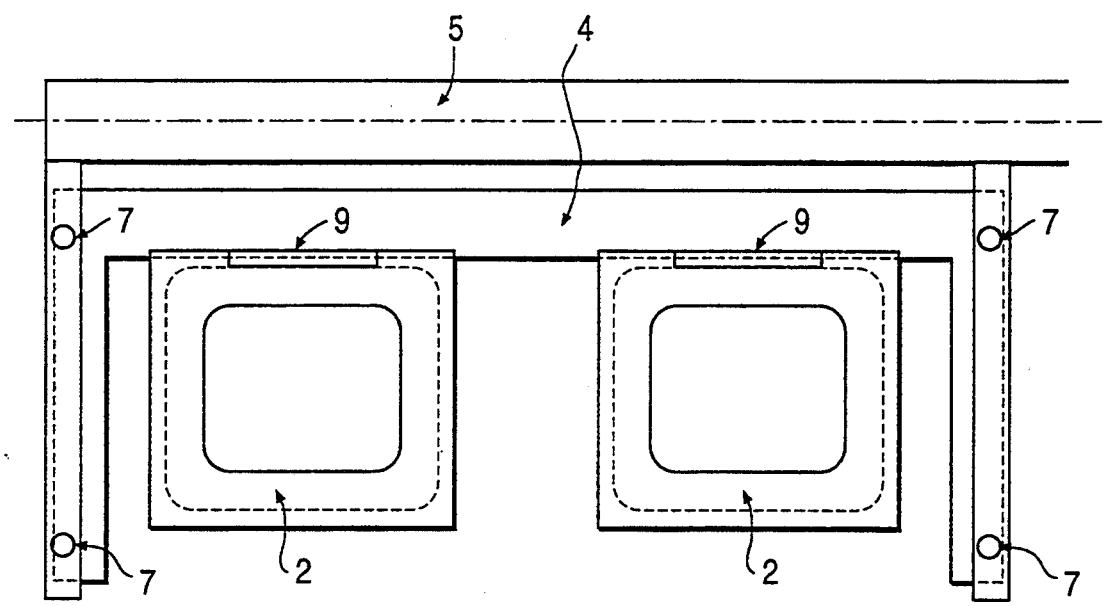
FIG. 10A shows a plan view of a part of the device of FIG. 10.
Figure 10B:
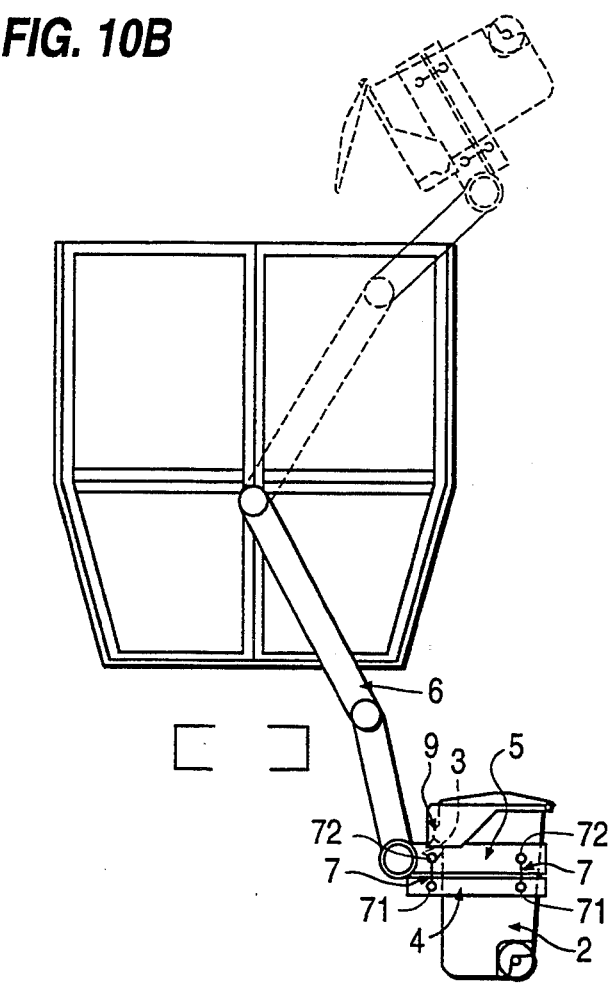
FIGS. 10B–10D show end views of the device of FIG. 10 during various operating positions thereof.
Figure 10C:
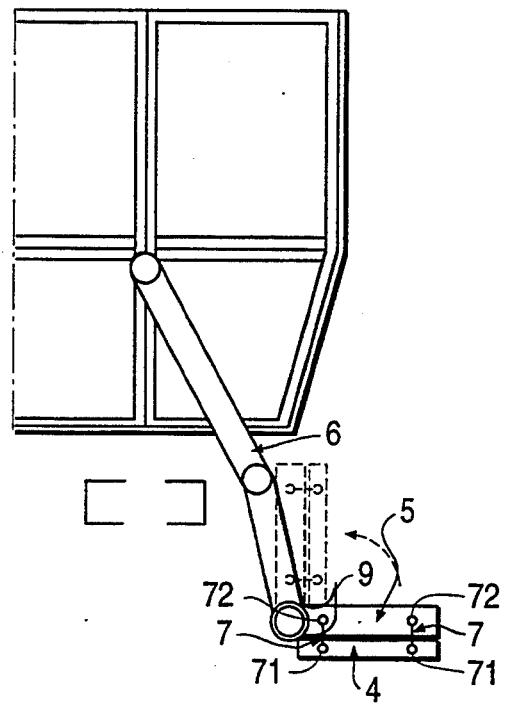
Figure 10D:
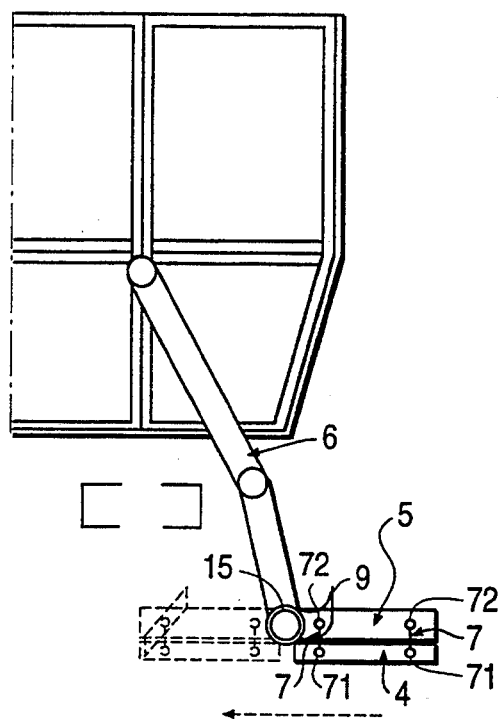

The FIGS. 10 to 10D show a loading and tilting mechanism 6 provided with a weighing device and mounted to a vehicle, in various views and positions of its parts.

The loading and tilting mechanism 6 comprises a pivoting arm 44 assembled from several parts, which is supported by the vehicle 1 through a supporting structure 45 which is not further described. The pivoting arm 44 carries the pivoting shaft 15 for the main frame 5. The main frame 5 has in turn been connected with the auxliliary frame 4 by means of the coupling members 7 and weighing of a container to be emptied can take place in the way already described above. After use of the device, it can be brought under the vehicle, such as in particular appears from FIG. 10. It will be obvious, that the device can also be mounted to other sides of the vehicle and that combinations with other embodiments of the device are also possible.

The FIGS. 11, 11A, 11B and 11C show various positions of a device, which corresponds largely to that according to the FIGS. 7, 7A, 7B and 7C. Here, the auxiliary frame 4 is also U-shaped, yet seen in side view. It will consist of two U-shaped frameworks being at a distance from each other in transverse direction, which have been connected with each other by spacers not further indicated. The upper end of one leg of each U has been provided with a substantially horizontally extending part, which at its free end has been connected with a coupling member 7.

Figure 11:
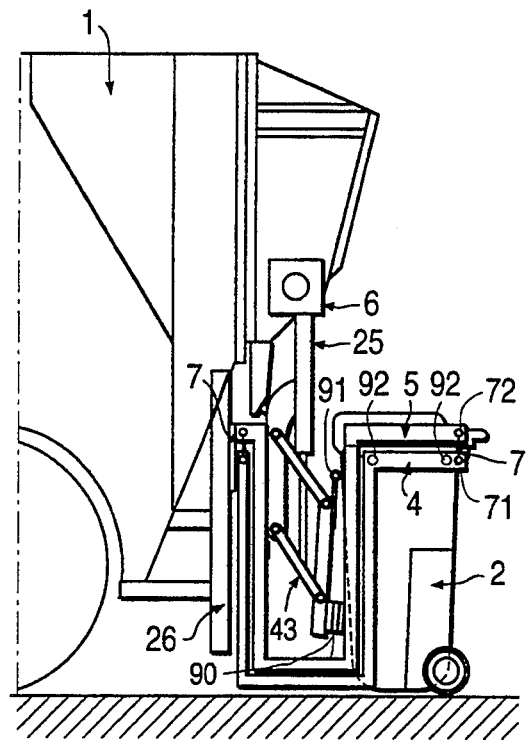
FIGS. 11, 11A, 11B and 11C show end views corresponding to the FIGS. 7, 7A, 7B and 7C, yet of a modified embodiment of the device.
Figure 11A:
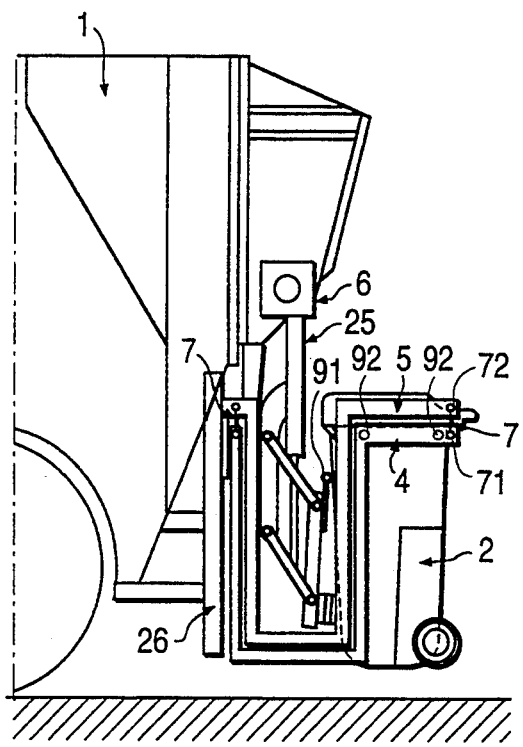
Figure 11B:
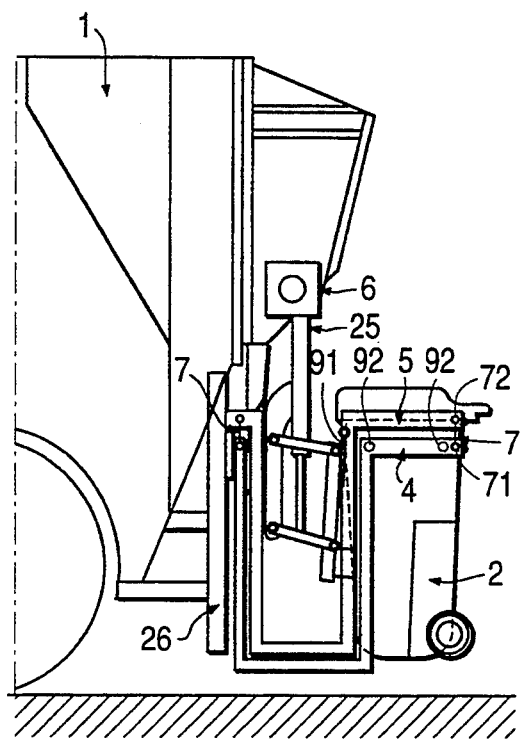
Figure 11C:
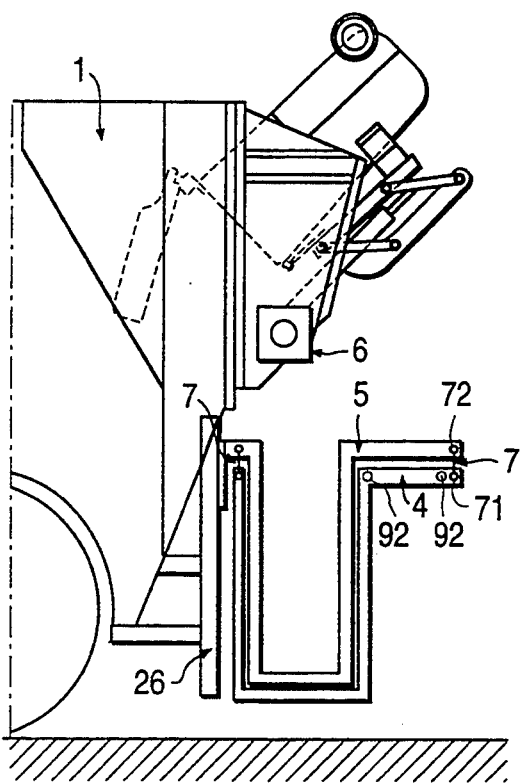
Figure 12:
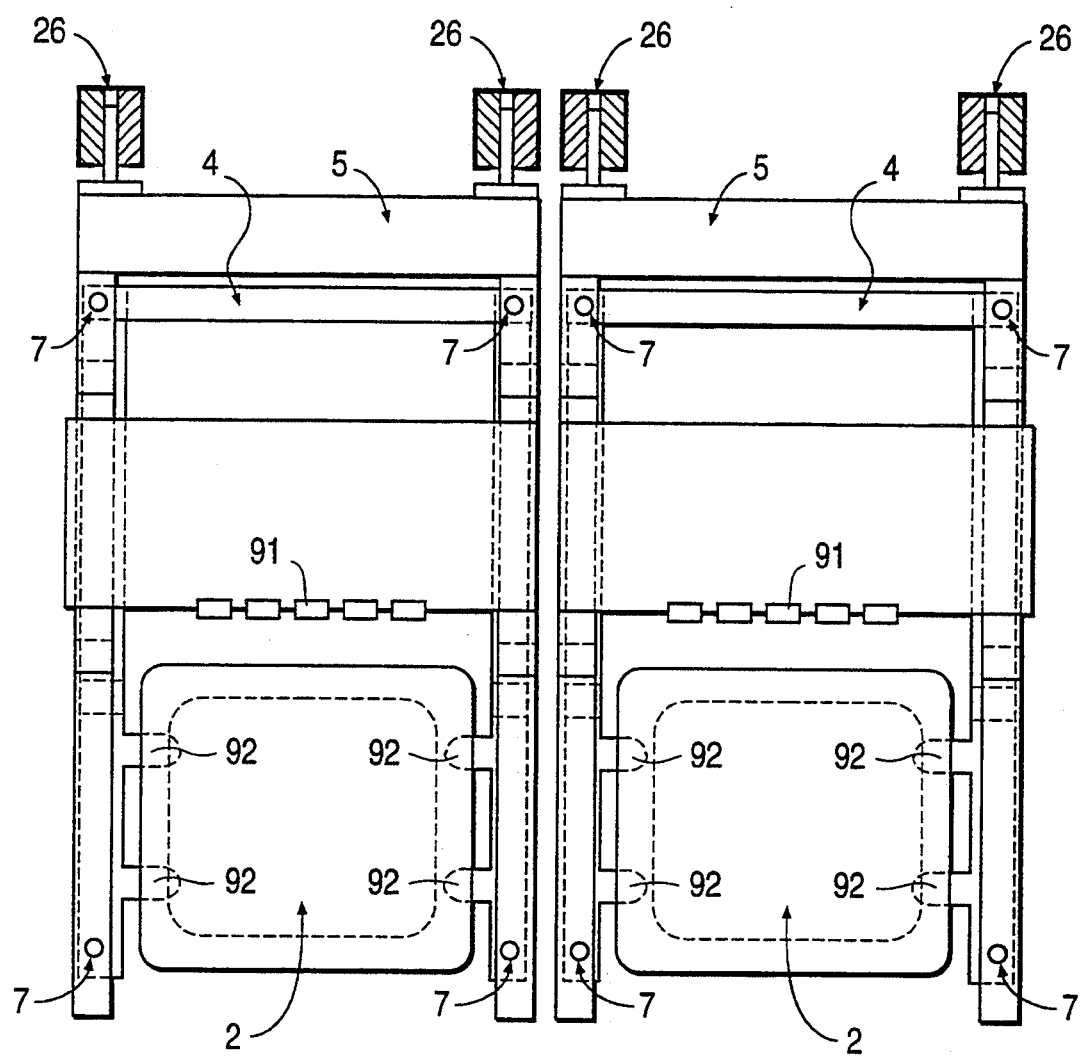
FIG. 12 shows a plan view of the device according to FIG. 11, it being suitable for simultaneous weighing two containers.

FIG. 12 shows a plan view of the device according to FIG. 11, in which two containers can be handled simultaneously.

Figure 13:
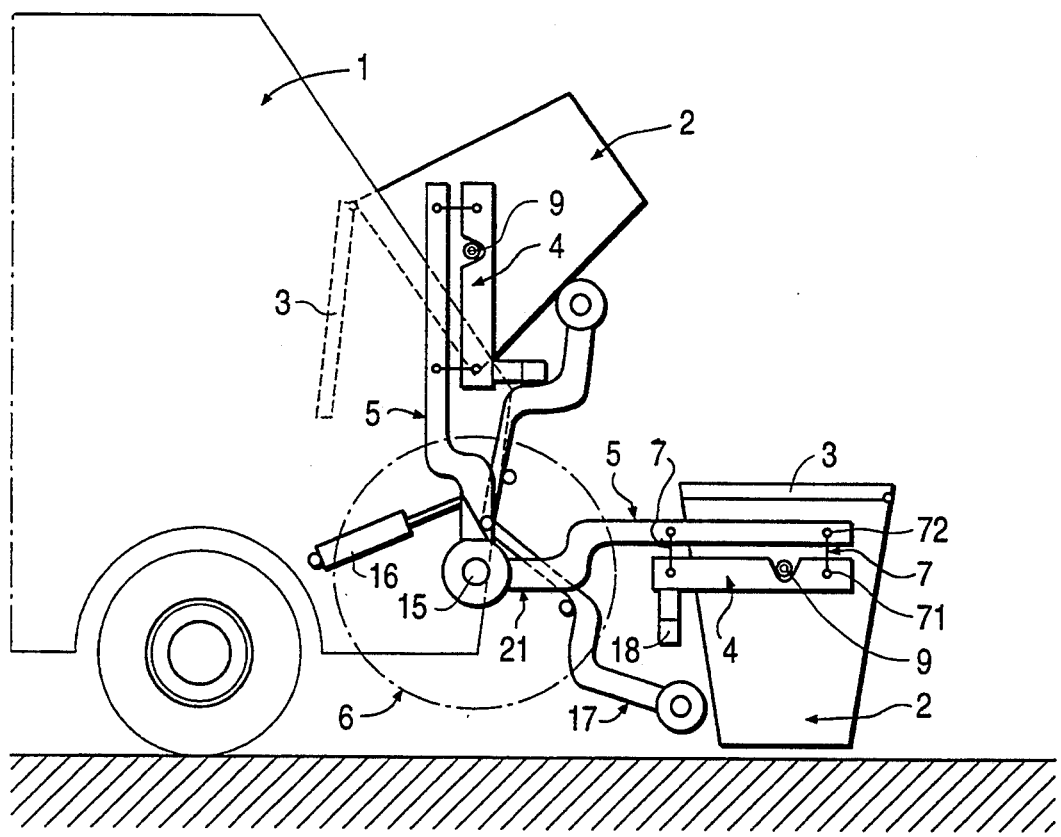
FIG. 13 diagrammatically shows a side view of yet another embodiment.

FIG. 13 shows a device in which the main frame 5 is constituted by two pivoting arms 21 which have been connected with each other by means of the pivoting shaft 15, so that again a U-shaped frame is obtained. Pivoting of this frame 5 takes place with the help of a pressurized medium cilinder 16.

An auxiliary tilting mechanism 17 provides for an extra tilting movement being granted to the container 2 with its upward pivoting movement, so that the contents of the container ends up into the means of transport 1.

Figure 13A:
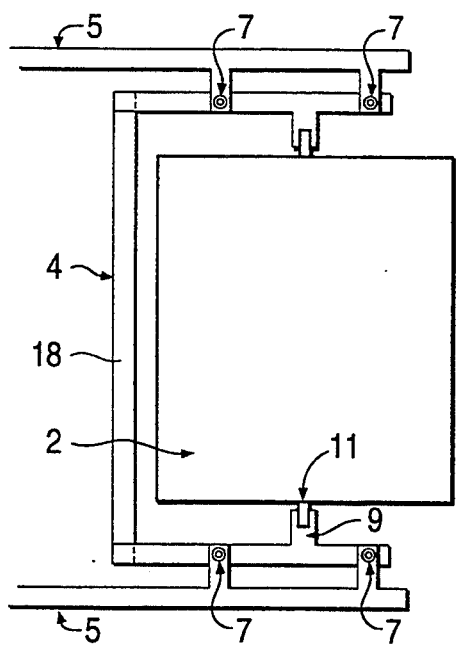
FIG. 13A and 13B show plan views of two different ways of placement of the main frame in relation to the auxiliary frame with the embodiment according to FIG. 13.
Figure 13B:
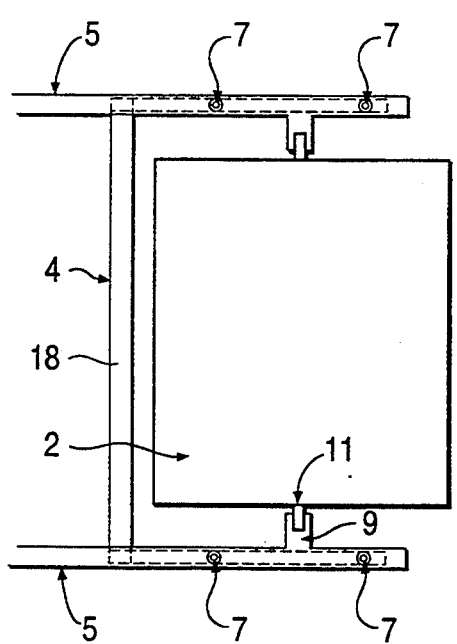

In the embodiment according to FIG. 13A the legs of the auxiliary frame 4, seen in plan view, are within those of the main frame 5, whereas in the embodiment according to FIG. 13B said legs are above each other.

Figure 14:
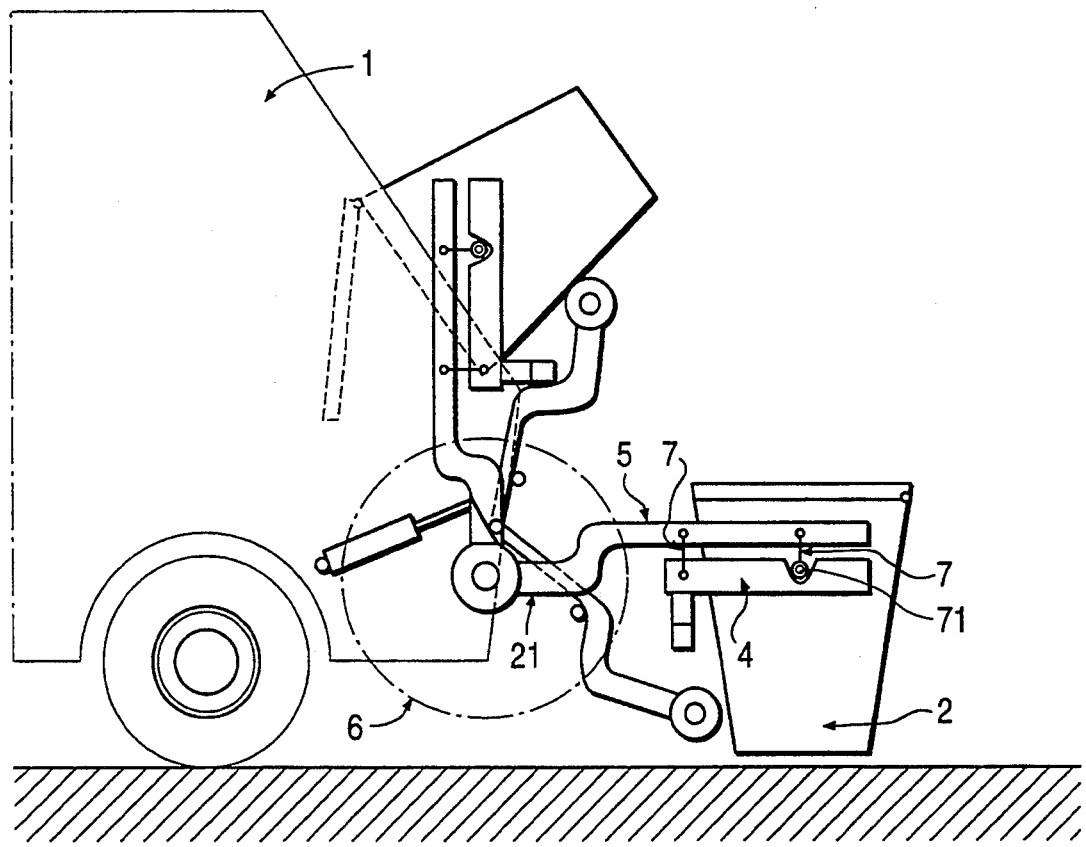
FIG. 14 diagrammatically shows a side view of yet another embodiment.
Figure 14A:
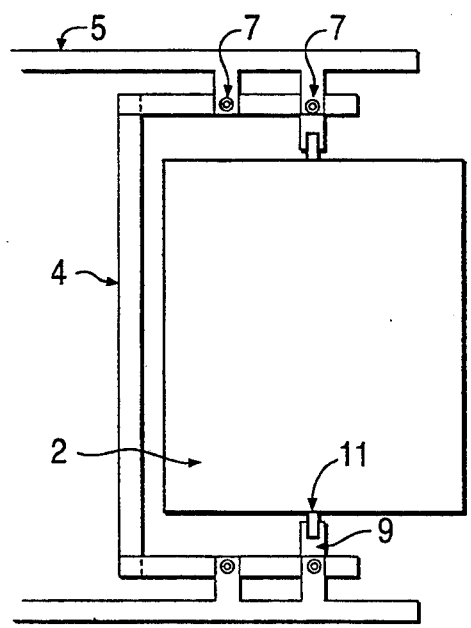
FIG. 14A and 14B show plan views of two different ways of placement of the main frame in relation to the auxiliary frame with the embodiment according to FIG. 14.
Figure 14B:
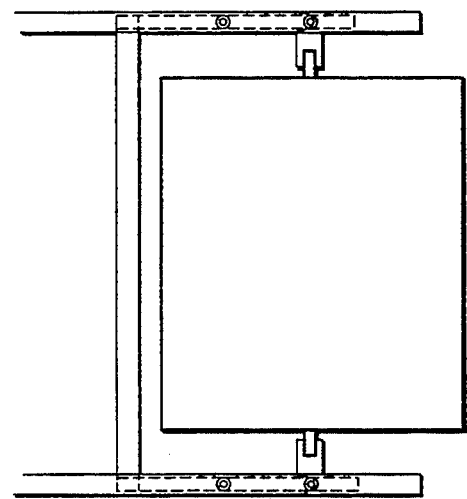

The embodiment according to FIG. 14 substantially corresponds to that of FIG. 13. However, here the attaching members 11 and the engaging members 12 are on one line with the fastening points 71 of two coupling members 7 at the auxiliary frame 4. Due to this, the weight of the lifted container can immediately be determined from the measurement of the forces exerted on the coupling members 7 concerned.

Figure 15:
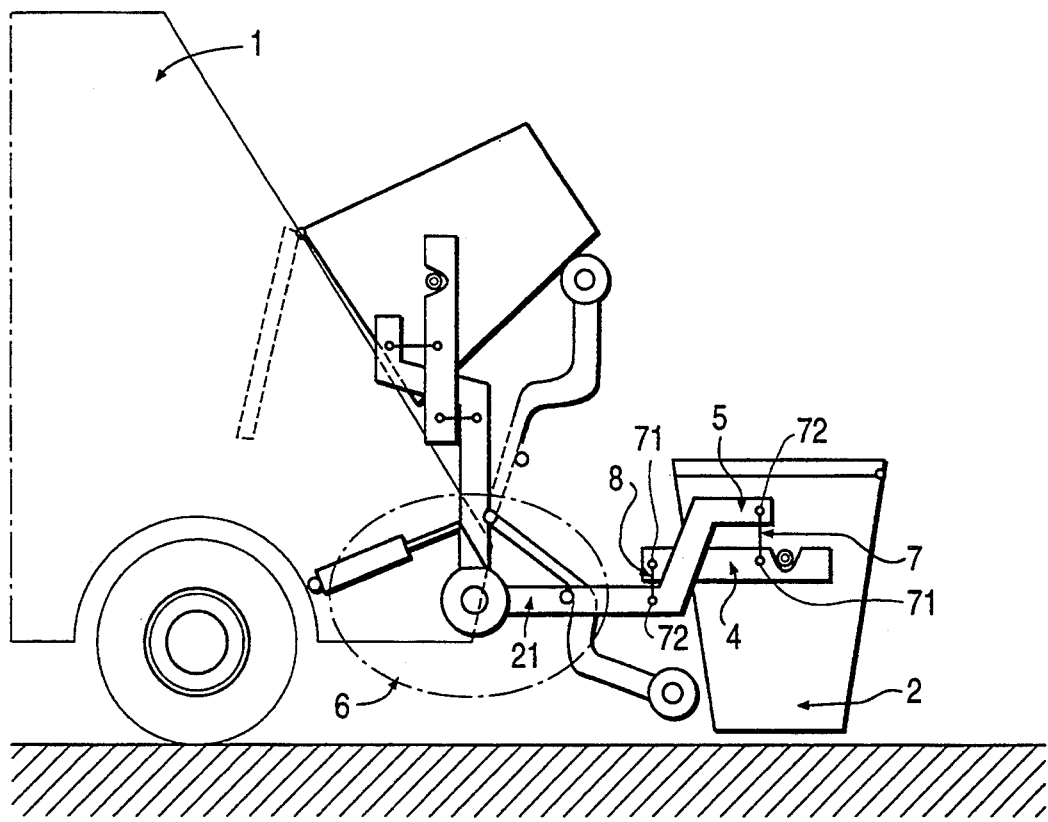
FIG. 15 diagrammatically shows a side view of a further embodiment.
Figure 15A:
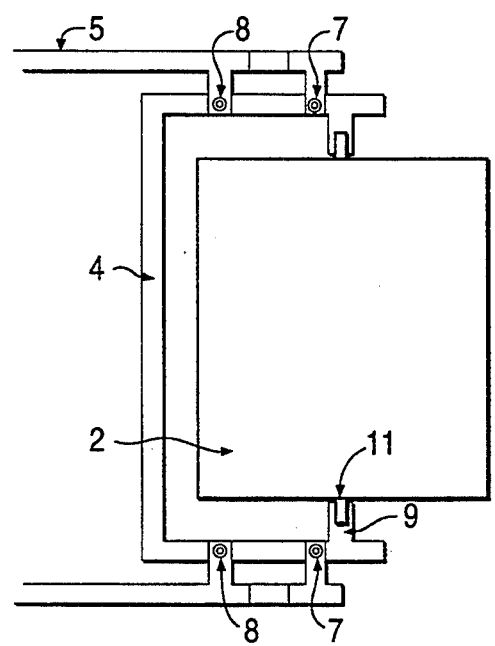
FIG. 15A shows a plan view of the device of FIG. 15.

The FIGS. 15 and 15A show a loading and tilting mechanism which again corresponds largely to that according to the FIGS. 13 and 14. However, here the container 2 is suspended balancing in two points which are outside of the space which is defined by the four fastening points 71 of the coupling members 7 to the auxiliary frame 4. As a result of this, the auxiliary frame 4 will have a tendency to tilt under the weight of the container 2 and this tilting movement is counteracted by the oppositely directed coupling members 8, of which the fastening points 71 to the auxiliary frame 4 are above the fastening points to the main frame 5. So here, the center of gravity of the load is outside the space defined by the fastening points 71.

Figure 16:
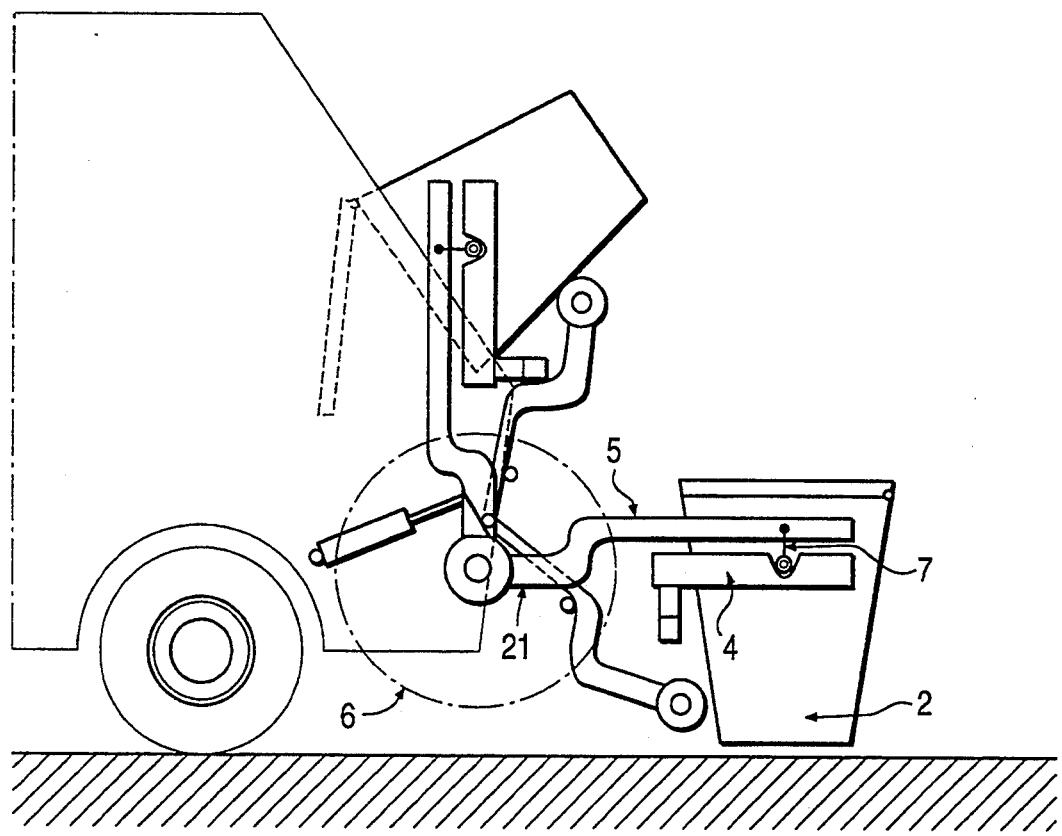
FIG. 16 diagrammatically shows a plan view of a further embodiment.
Figure 16A:
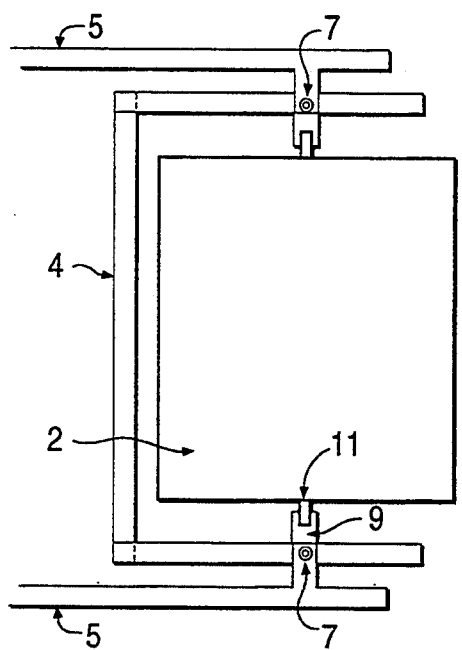
FIGS. 16A and 16B show plan views of two different ways of placement of the main frame in relation to the auxiliary frame with the embodiment according to FIG. 16.
Figure 16B:
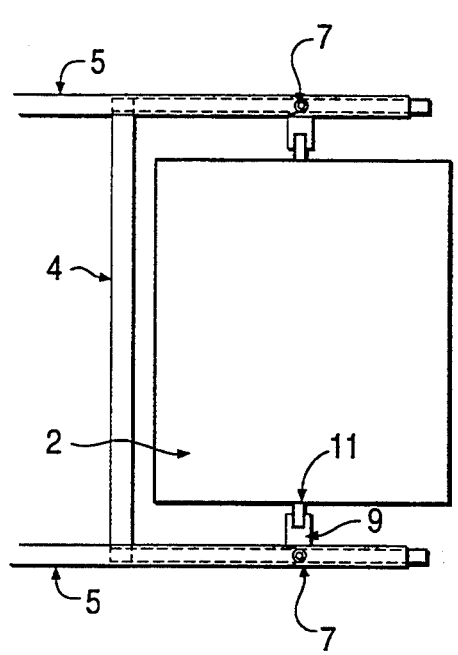

The FIGS. 16, 16A and 16B again show a structure which corresponds largely to that according to FIG. 14. However, here the center of gravity of the auxiliary frame 4 is on the same line as the engaging members 9 and the fastening points 71 of the coupling members 7 at the auxiliary frame 4, so that the auxiliary frame is in balance at both sides of this line. Owing to this, the auxiliary frame 4 can be in any possible position in relation to the main frame 5 and be in balance in relation to said line, without affecting the weighing with the help of the two coupling members 7.

The FIGS. 17 through 21 show a system as it can be applied in practice for lifting a container and emptying it in a garbage truck.

Figure 17:
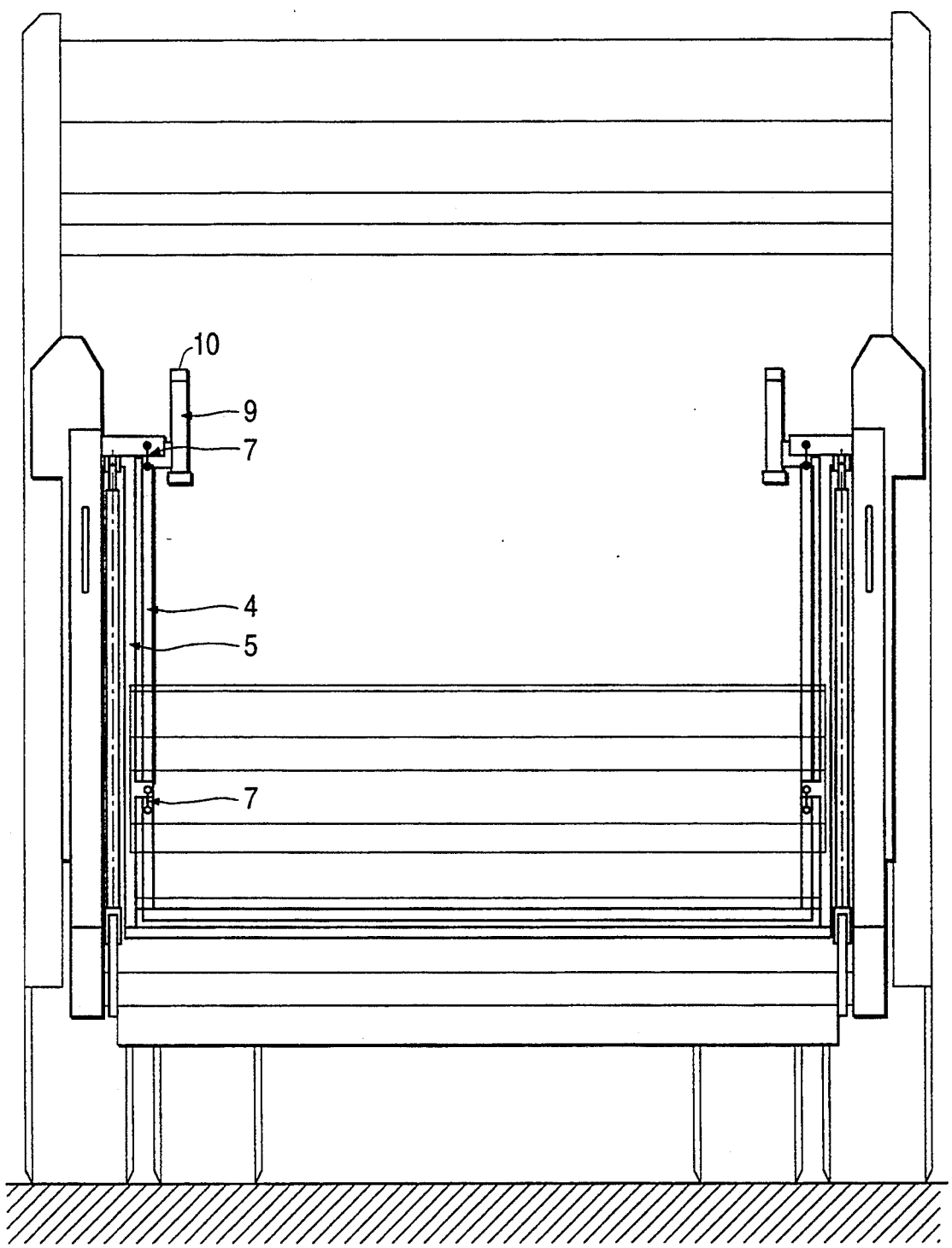
FIG. 17 diagrammatically shows a rear view of a garbage truck provided with a loading and tilting mechanism, yet with omission of the weighing device.
Figure 18:
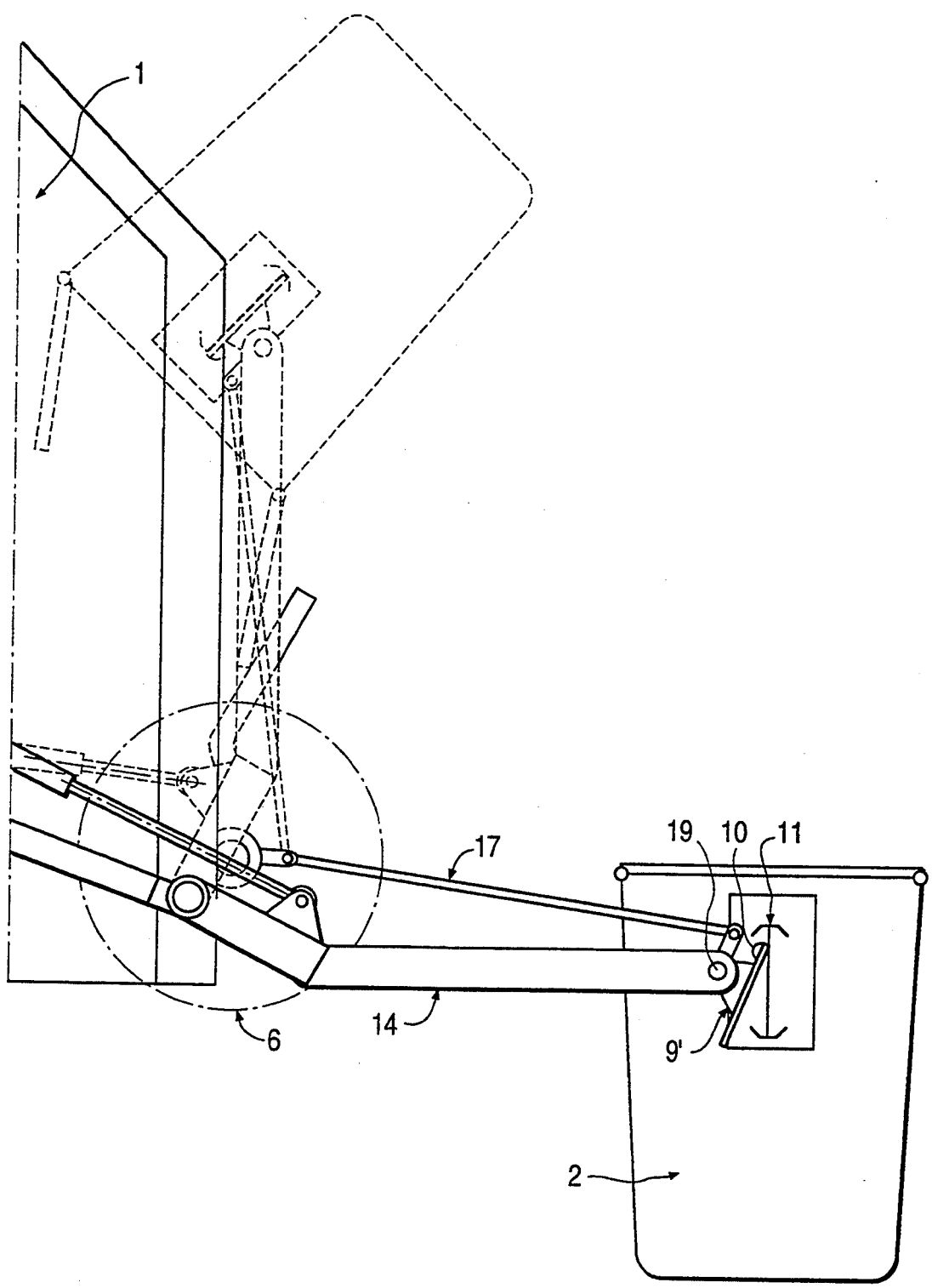
FIG. 18 shows a side view of a part of the garbage truck of FIG. 17.

The FIGS. 17 and 18 show the system without a weighing device. Two engaging members 9' have been connected with pivotably arranged shafts 19, which are at the outer ends of pivoting arms 14. With pivoting the container 2 upward, the shafts 19 are pivoted by the auxiliary tilting mechanism 17 for consequently producing the tilting movement of the container 2. Here, the pivoting arms 14 do not constitute the above-mentioned main frame 5.

Figure 19:
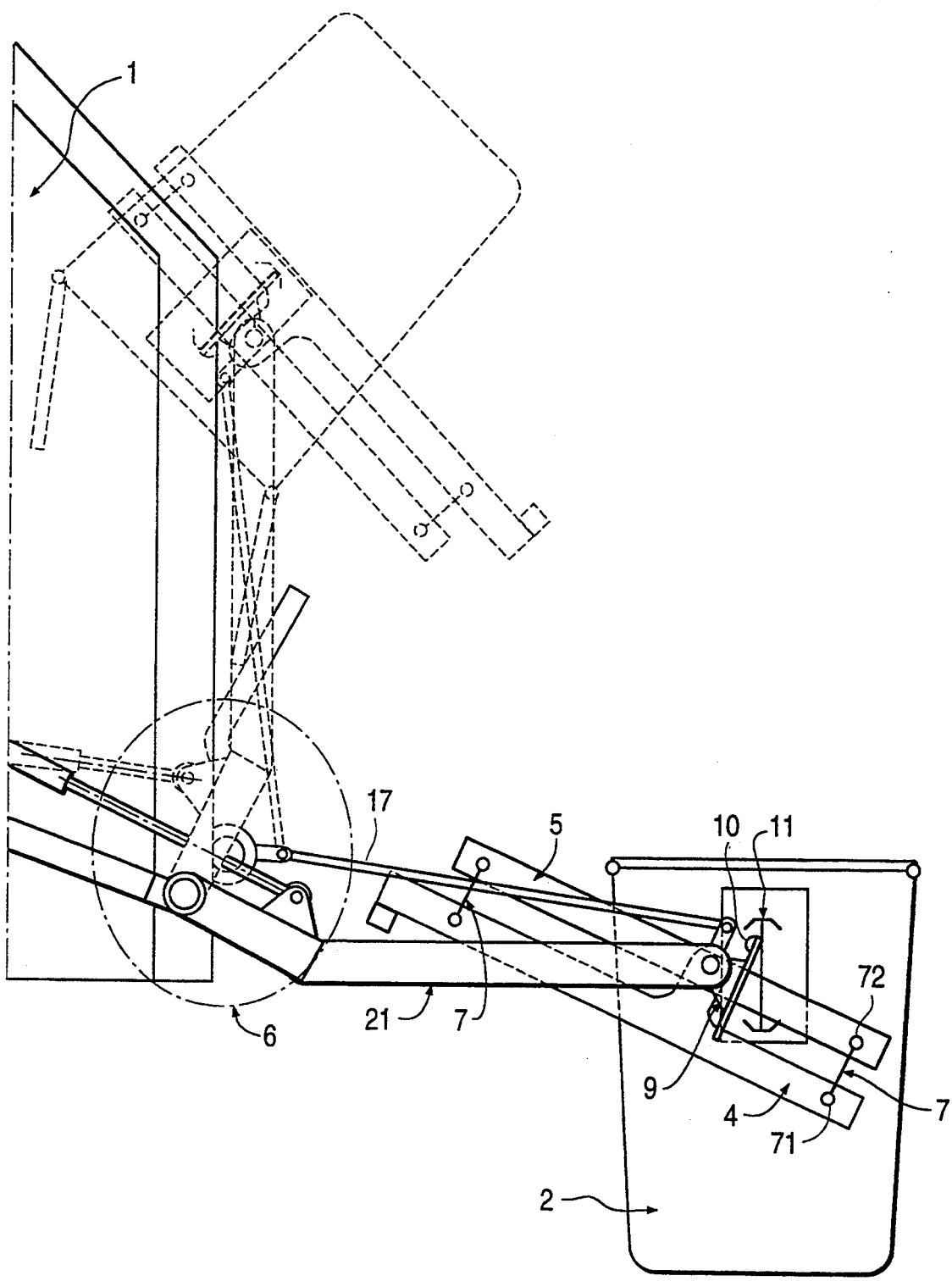
FIG. 19 diagrammatically shows a side view corresponding to FIG. 18, yet in which the weighing device has been fitted.
Figure 20:
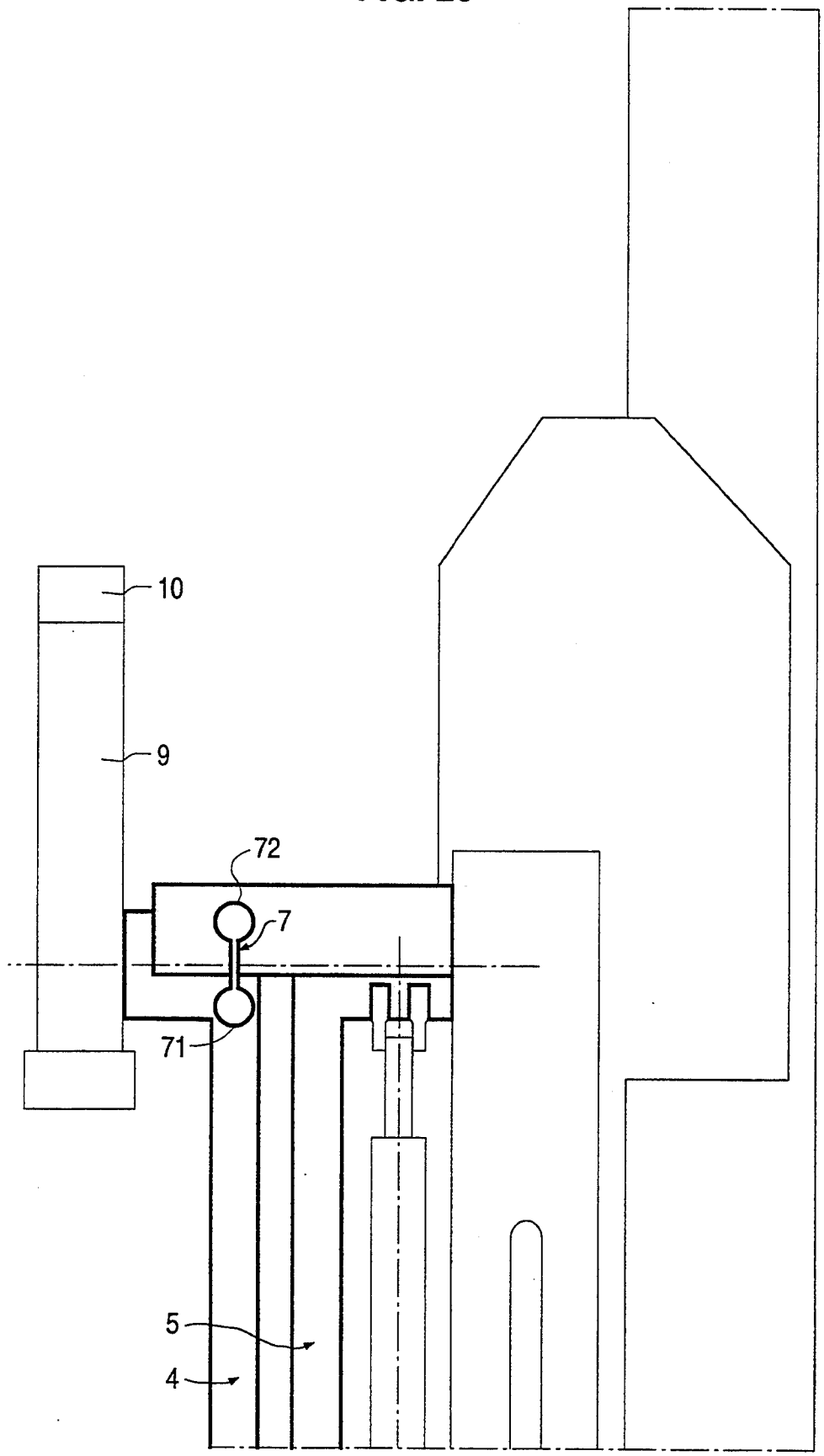
FIG. 20 shows a rear view, on an enlarged scale, of a part of FIG. 19.
Figure 21:
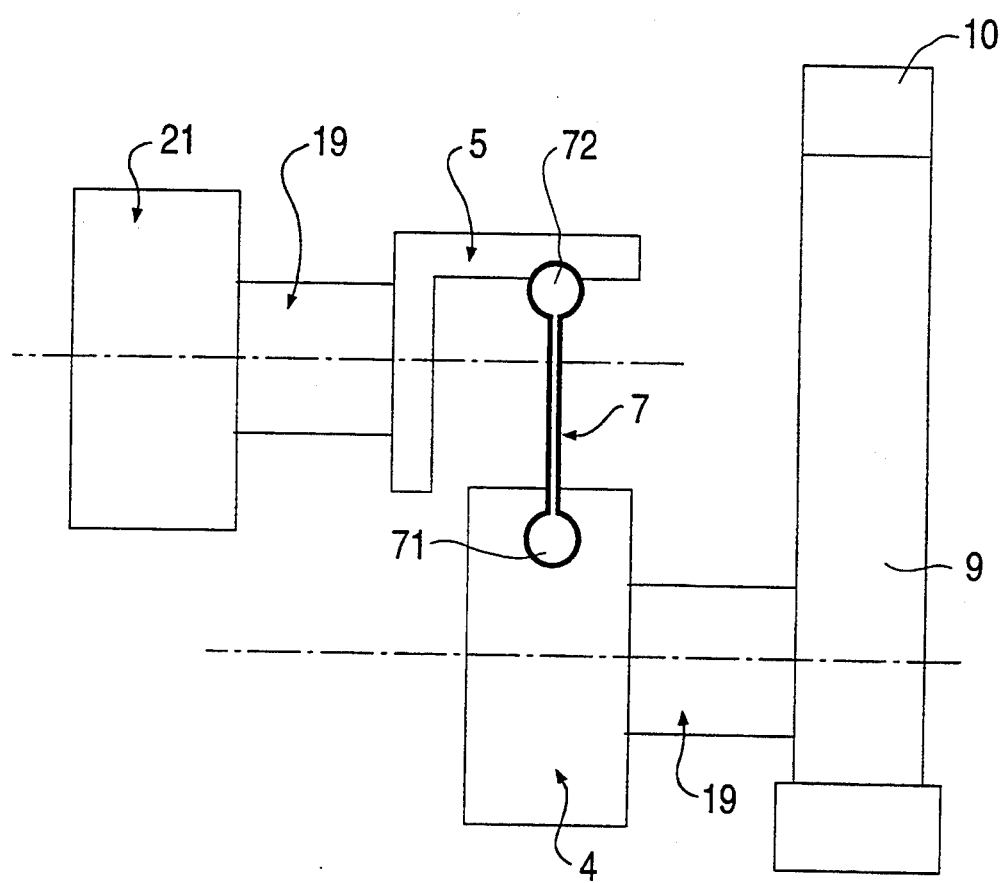
FIG. 21 shows a part of a rear view of the device of FIG. 19.

FIG. 19 shows the device according to the FIGS. 17 and 18, yet here with a weighing device mounted thereto. The FIGS. 20 and 21 show some details of the device of FIG. 19. For example, FIG. 21 shows the shafts 19 on an enlarged scale. The parts of the shaft 19 constitute a connection between a pivoting arm 14 and an engaging member 9, the shaft being discontinued, such that the end of one part is at the side of the pivoting arm for lifting the main frame 5, whereas the other end is at the engaging member 9 and has been mounted to the auxiliary frame 4. The main frame 5 and the auxiliary frame 4 have been connected with each other by the coupling members 7. Because of this, the main frame, together with the auxiliary frame 4 coupled thereto, pivots with the shaft 19 of the auxiliary tilting mechanism 17.

Since the engaging member has been fixedly connected with the auxiliary frame 4, it pivots along with the auxiliary frame in order to provide for that the engaged container 2 in its upward pivoting movement is also stimulated to a tilting movement, in the same way as this occurs with the system without weighing device.

The point where the engaging members 9 or 9' contact the attaching members 11 of a container has been indicated with 10 in FIG. 18 and the following figures.

When the coupling members 7 have been arranged flexibly or as a cardan-type, these can be brought into a fixed position in the tilting movement going further if so desired.

Figure 22:
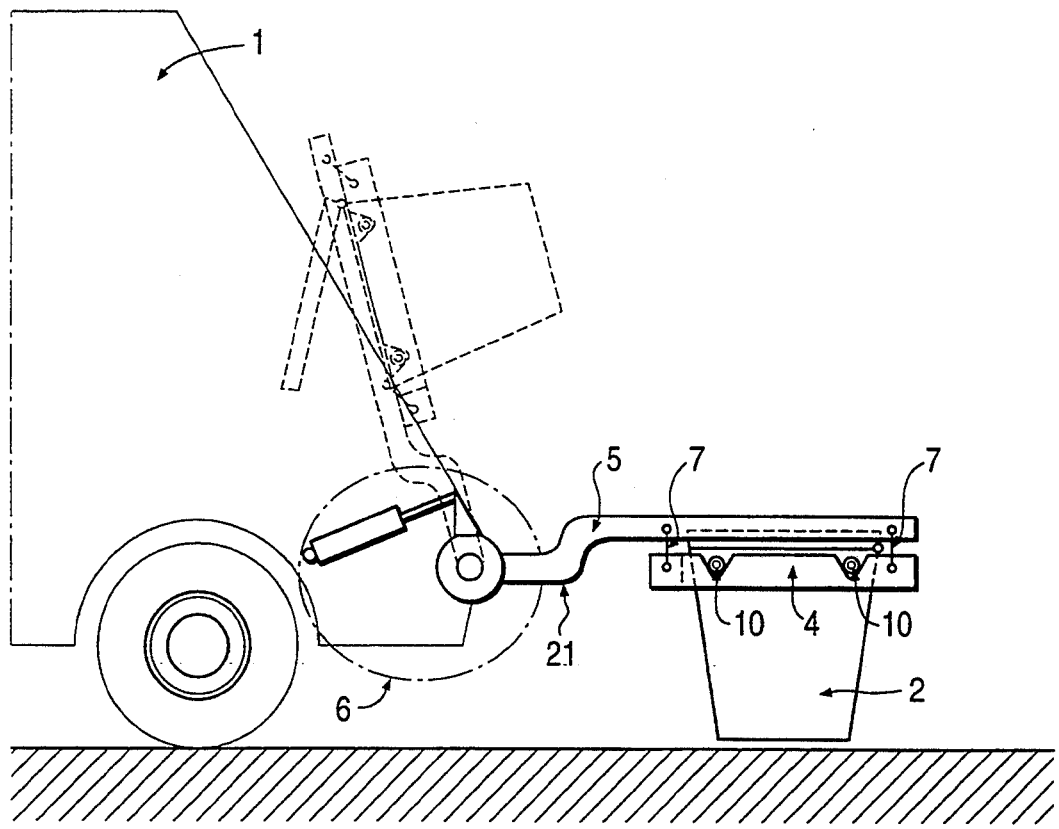
FIG. 22 diagrammatically shows a side view of a further embodiment.
Figure 22A:
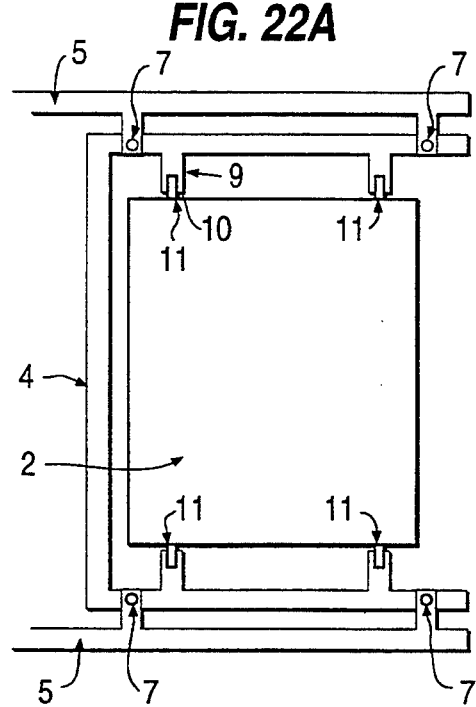
FIGS. 22A and 22B show plan views of two different ways of placement of the main frame in relation to the auxiliary frame with the embodiment according to FIG. 22.
Figure 22B:
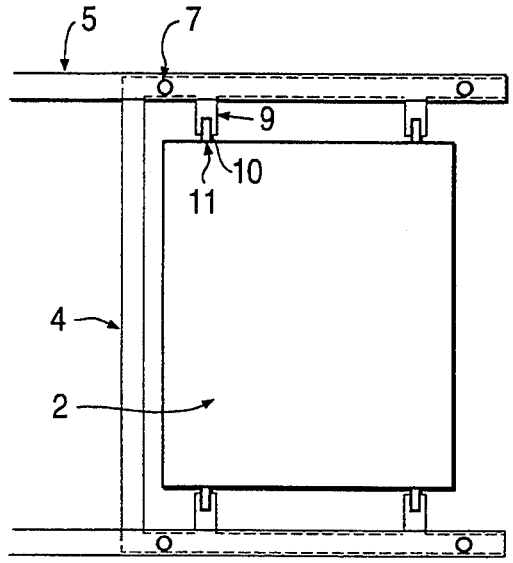

In the embodiment according to the FIGS. 22, 22A and 22B, the container 2 has been suspended in four engaging points, as a result of which is has not been suspended balancing to the auxiliary frame 4. The center of gravity of the load is in weighable condition between the lines of force going through the attaching points 71 of the coupling members 7.

In arranging the main frame 5 somewhat slanting, the centre of gravity will also be displaced in relation to the connecting points 71 of the coupling members 7. Therefore, it is necessary to measure the forces being exerted on all coupling members 7 present, since there is no fixed ratio in the distribution of the weight of the container 2 over the various coupling members 7.

Figure 23:
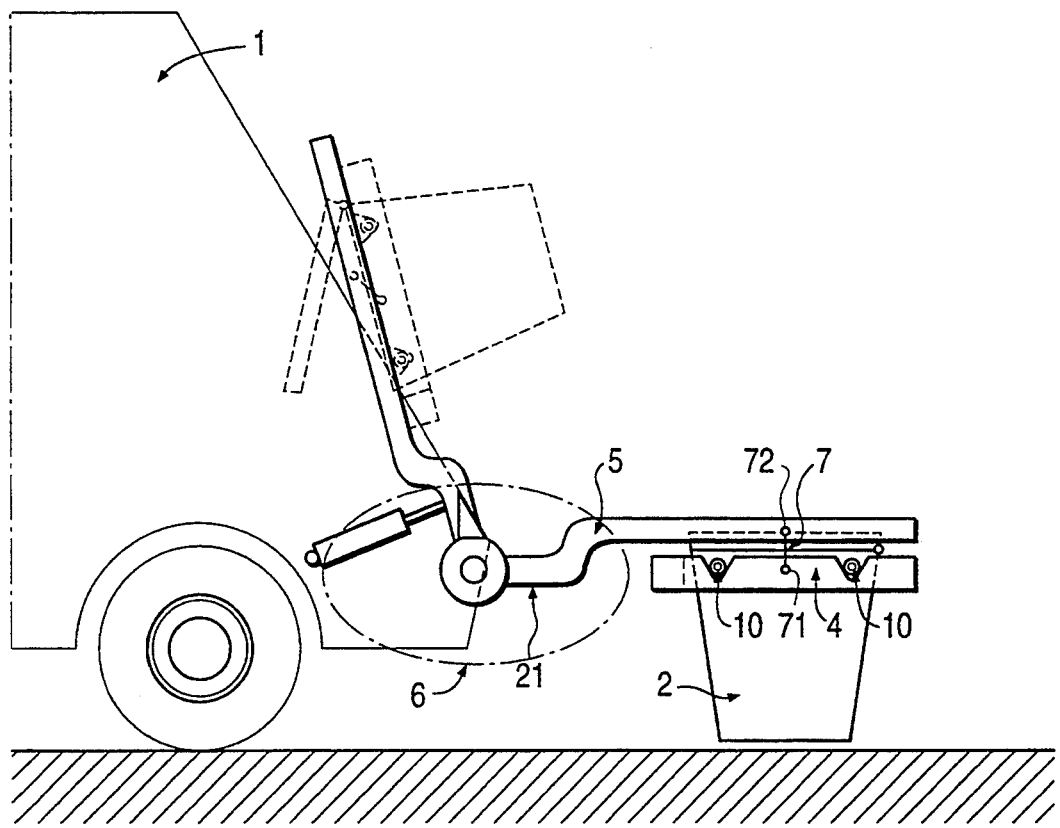
FIG. 23 diagrammatically shows a side view of a further embodiment of a means of transport according to the invention.
Figure 23A:
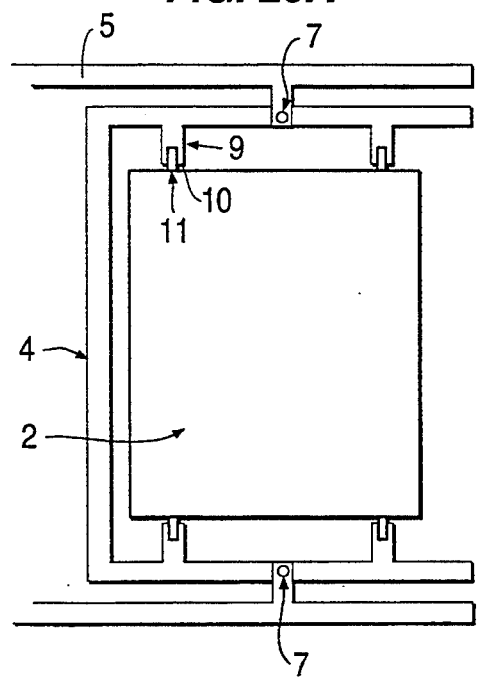
FIGS. 23A and 23B show plan views of two different ways of placement of the main frame in relation to the auxiliary frame with the embodiment according to FIG. 23.
Figure 23B:
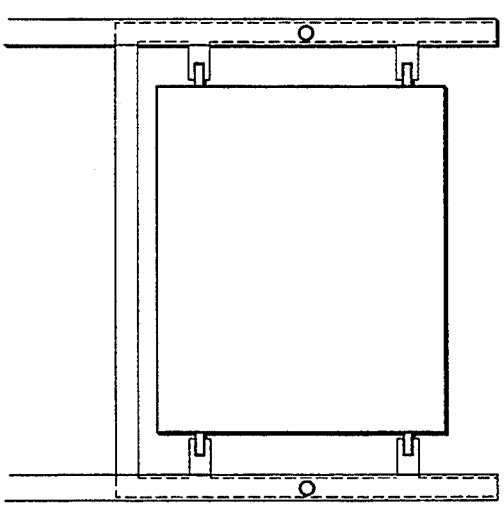
Figure 24:
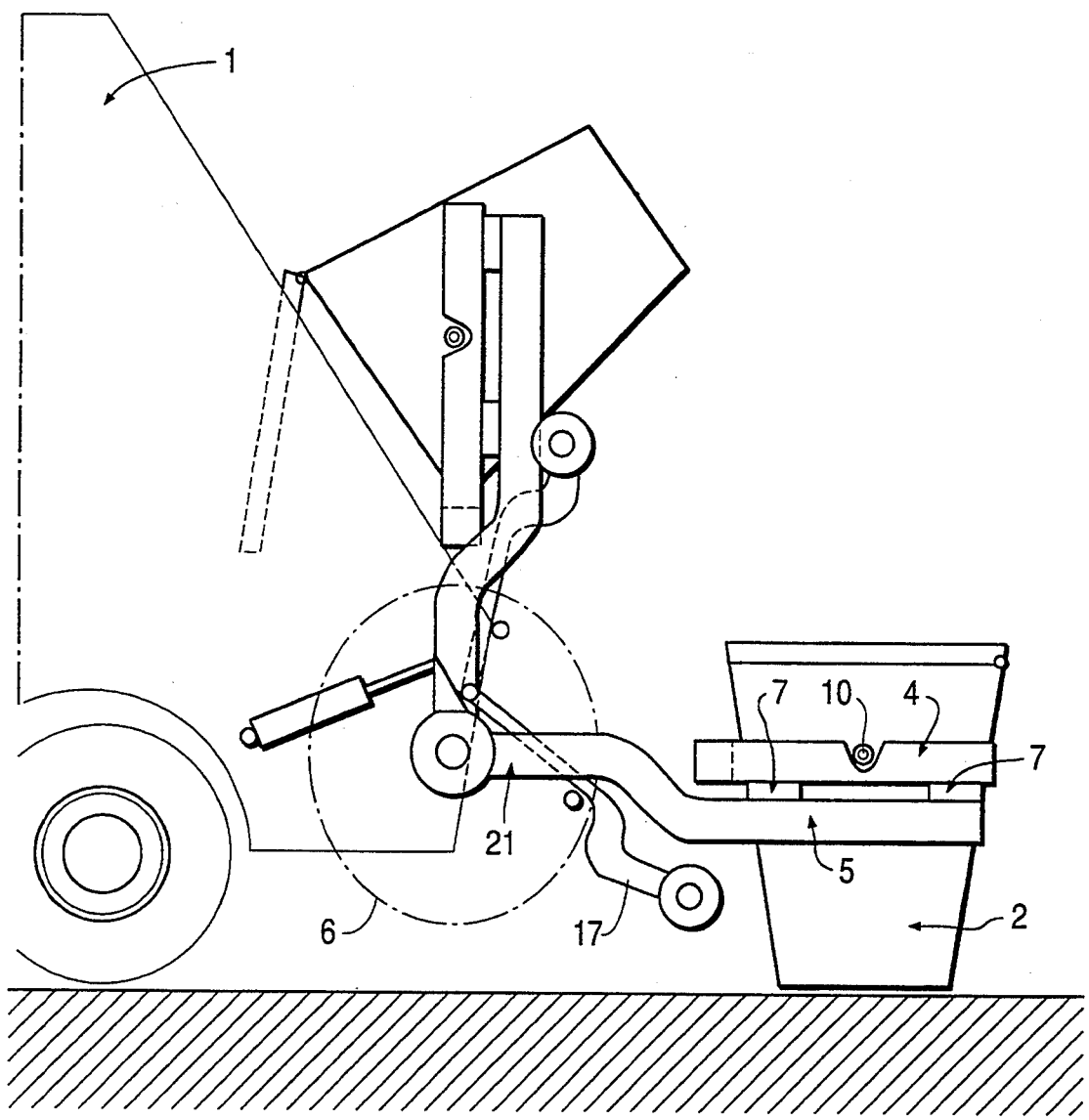
FIGS. 24 through 27 diagrammatically show side views of four further embodiments of a means of transport according to the invention.

The FIGS. 23, 23A and 23B show an embodiment which corresponds largely to that according to FIG. 22, the difference being that the auxiliary frame 4 has only been connected with the main frame 5 by means of two coupling members 7, which have flexible or cardan-type fastening points 71 and 72.

Because of this, the load, that is, the total weight of the container 2 and of the auxiliary frame 4, will come to hang balancing to the main frame 5. By this, one achieves the same effect as in the embodiment according to FIG. 16.

The embodiment according to FIG. 22 corresponds largely to that according to FIG. 13, yet here the auxiliary frame 4 has been supported instead of suspended in relation to the main frame 5 by means of the coupling members 7.

Figure 25:
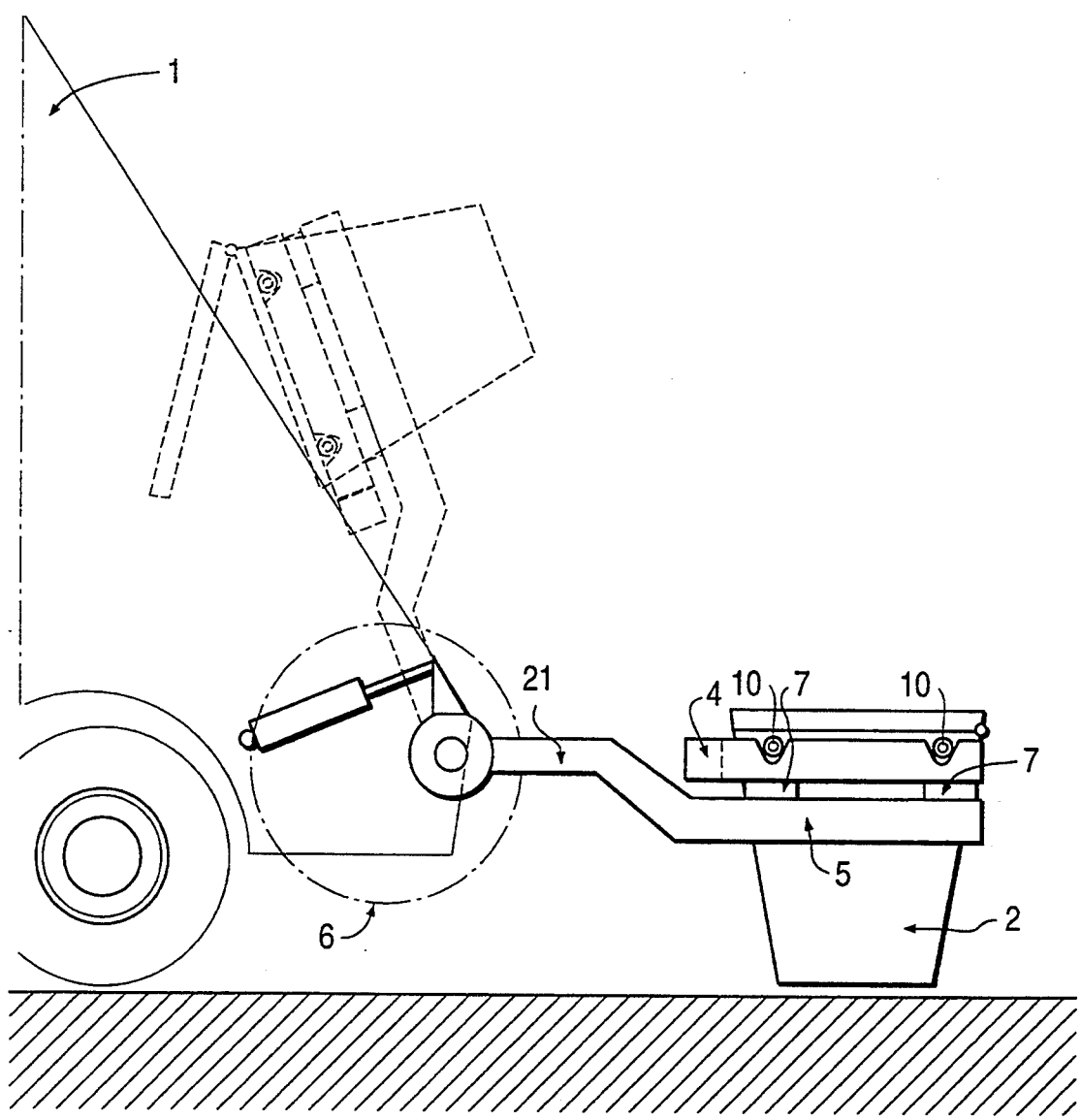

The embodiment according to FIG. 25 corresponds largely to that according to FIG. 22, but here again the auxiliary frame 4 has been supported instead of suspended to the main frame 5 by means of the coupling members 7.

Figure 26:
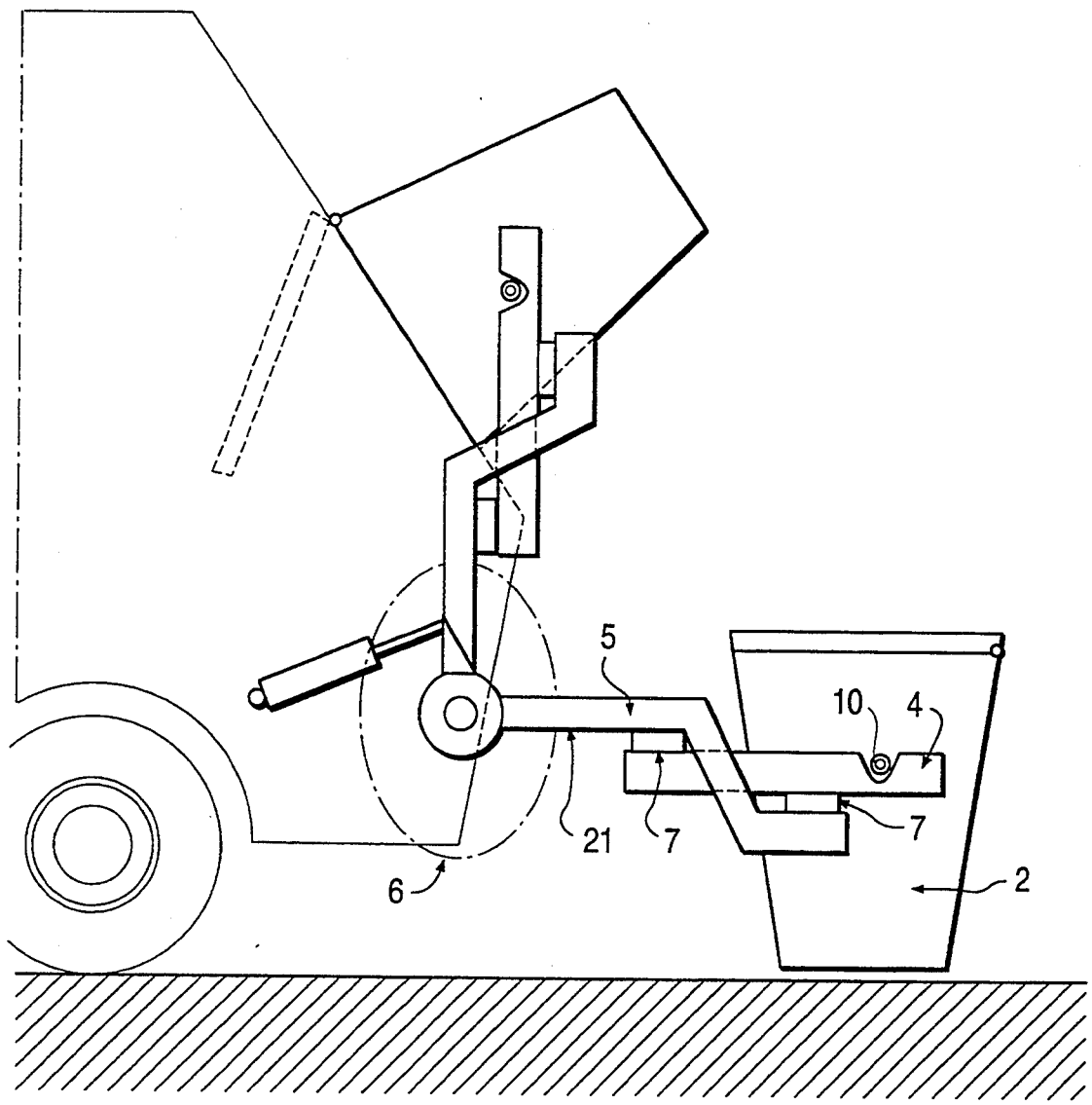

The embodiment according to FIG. 26 corresponds largely to that of FIG. 15, yet here the coupling members 7 are again strained under pressure by their arrangement between the auxiliary frame 4 and the main frame 5.

Figure 27:
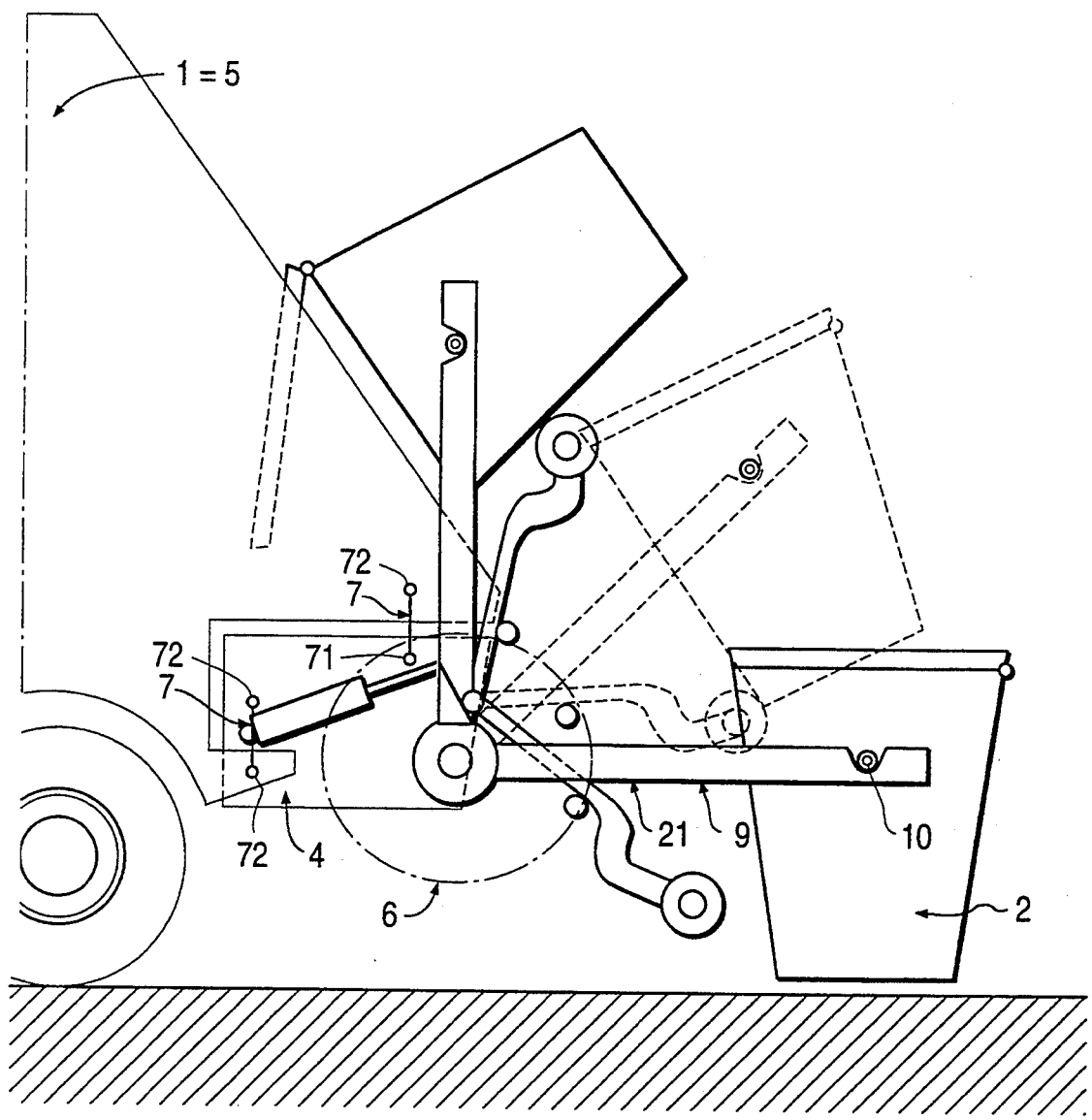

FIG. 27 shows an embodiment in which the weighing mechanism again operates in the same way as that according to FIG. 15. In order to weighably connect the container 2 with the loading and tilting mechanism one has made use of the means of transport itself. Namely, the main frame 5 is part of the means of transport and the auxiliary frame 4 constitutes the basis of the loading and tilting system. Here, the pivoting arms 22 constitute the engaging members 9.

The advantage of this embodiment is that no complicated constructions need be made in a combination of a loading and tilting system and a weighing system, since here the weighing system is in a completely different place than the loading and tilting system.

Since in this embodiment the engaging points 10 and the connecting points 71 of the coupling members 7 are not always in the same place in relation to each other, due to the pivoting movement of the engaging members 9 in the pivot 15 of the loading and tilting system, the position of the pivoting arms, here constituted by the engaging members 9, in relation to the basis of the loading and tilting mechanism, in this case the auxiliary frame 4, will be also defining in determining the correct weight in connection with the displacement of the moment forces.

Figure 28:
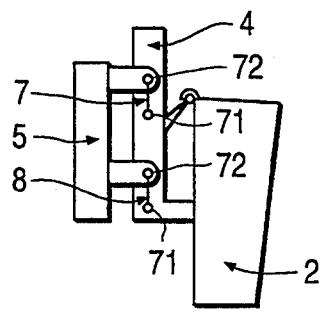
FIGS. 28, 28A, 28B, 28C, 28D, 28E, 28F and 28G diagrammatically show side views of different positions of some parts of a loading and tilting mechanism for small household garbage containers.
Figure 28A:
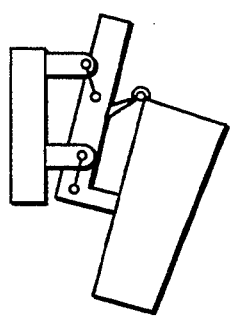
Figure 28B:
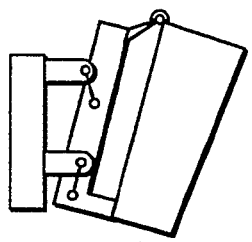
Figure 28C:
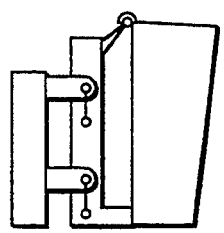
Figure 28D:
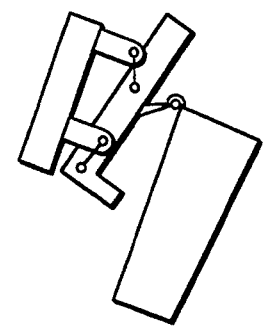
Figure 28E:
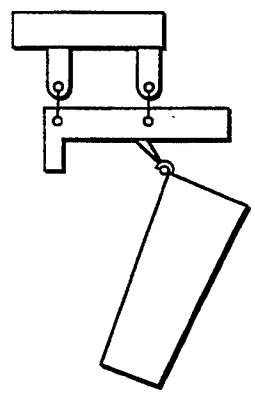
Figure 28F:
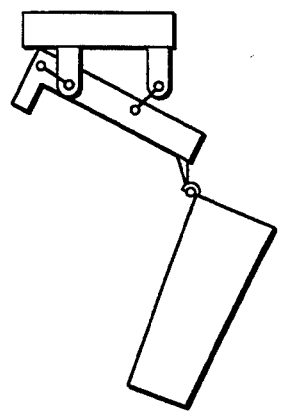
Figure 28G:
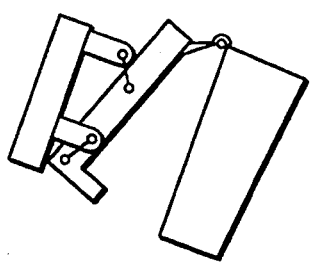

In the embodiment according to FIG. 28 the main frame 5 has been mounted to the outer end of the pivoting arms of a hoisting-pivoting mechanism 22. In this figure the pivoting arms are not visible. The sole purposes of the pivoting arms is to bring the main frame 5 into a certain position and they are part of the loading and tilting mechanism, which serves in particular for lifting and emptying household garbage containers.

Because of the shape of the main frame 5 and the place of the connections 72 of the coupling members at the main frame 5, the auxiliary frame 4 can be brought into a more vertical position.

In pivoting the main frame 5 the centre of gravity of the total load, that is, of the weight of the auxiliary frame 4 and of the container 2, can be displaced within or outside of the space between the lines of force going through the connecting points 71 between the coupling members 7 and/or 8 and the auxiliary frame 4. When the centre of gravity is displaced to outside of said space, some of the coupling members between the auxiliary frame 4 and the main frame 5 will be displaced in opposite direction when the coupling members have a flexible or cardan-type balancing operation. For the rest, all applications are possible as they have been described by means of preceding figures.

Figure 29A:
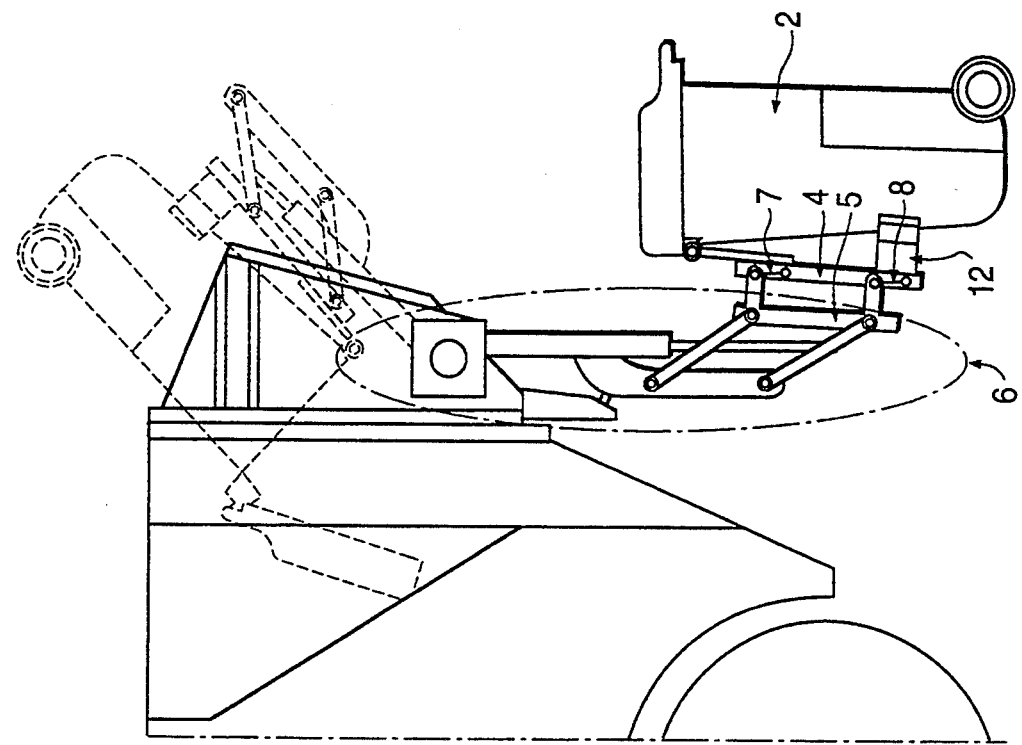
FIGS. 29A, B and C diagrammatically show side views of three different embodiments of a part of a means of transport at which the weighing device according to FIG. 28 has been applied.

The FIGS. 29A, B and C show practical embodiments for application of FIG. 28. Here, the loading and tilting system consists of a hoisting-pivoting mechanism 22 which is controlled by the pressurized medium cilinder 20, which provides for upward pivoting of the container 2 by means of a pivoting arm-parallel system. The container can be weighed during part of the pivoting movement.

After completion of the pivoting movement the pivoting and tilting mechanism 23 is activated by pivoting around the pivot 15, so that the contents of the container is brought into the vehicle. The upper coupling members 7 indicated in the drawing extend in the normal direction and the lower coupling members 8 can be reversely operating members, since in the weighing position of the auxiliary frame 4, the centre of gravity of the load is outside the space between the lines of force going through the fastening points 71 of the coupling members 7.

In the embodiment according to FIG. 29A, in the weighing position the container hangs completely balancing to the engaging points 10. Since here, a constant ratio is present in the distribution of weight over the various coupling members, only the force in the upper or lower coupling members has to be measured for being able to determine the weight of the engaged container 2.

Figure 29B:
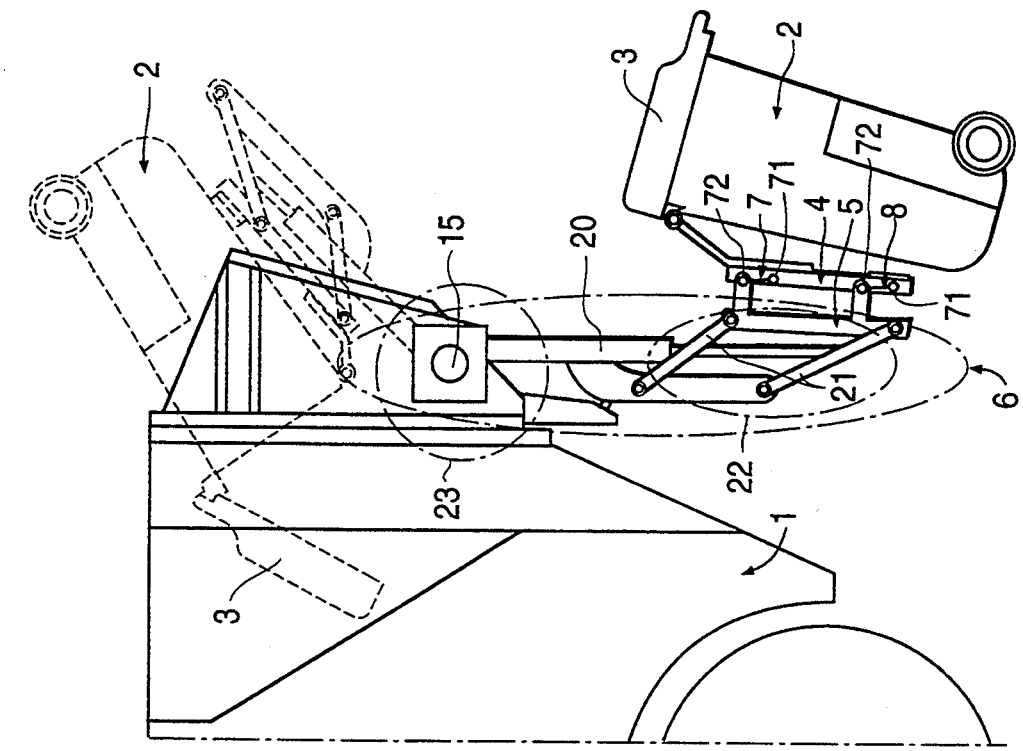

In the embodiment according to FIG. 29B the container 2 is supported at the bottom by the container support 12. Since with arranging the main frame 5 more slanted or vertically, the centre of gravity of the load is displaced in relation to the auxiliary frame, the force in all coupling members present must be measured for being able to determine the weight of the container 2. Here, the explanation with FIG. 22 can be referred to.

Figure 29C:
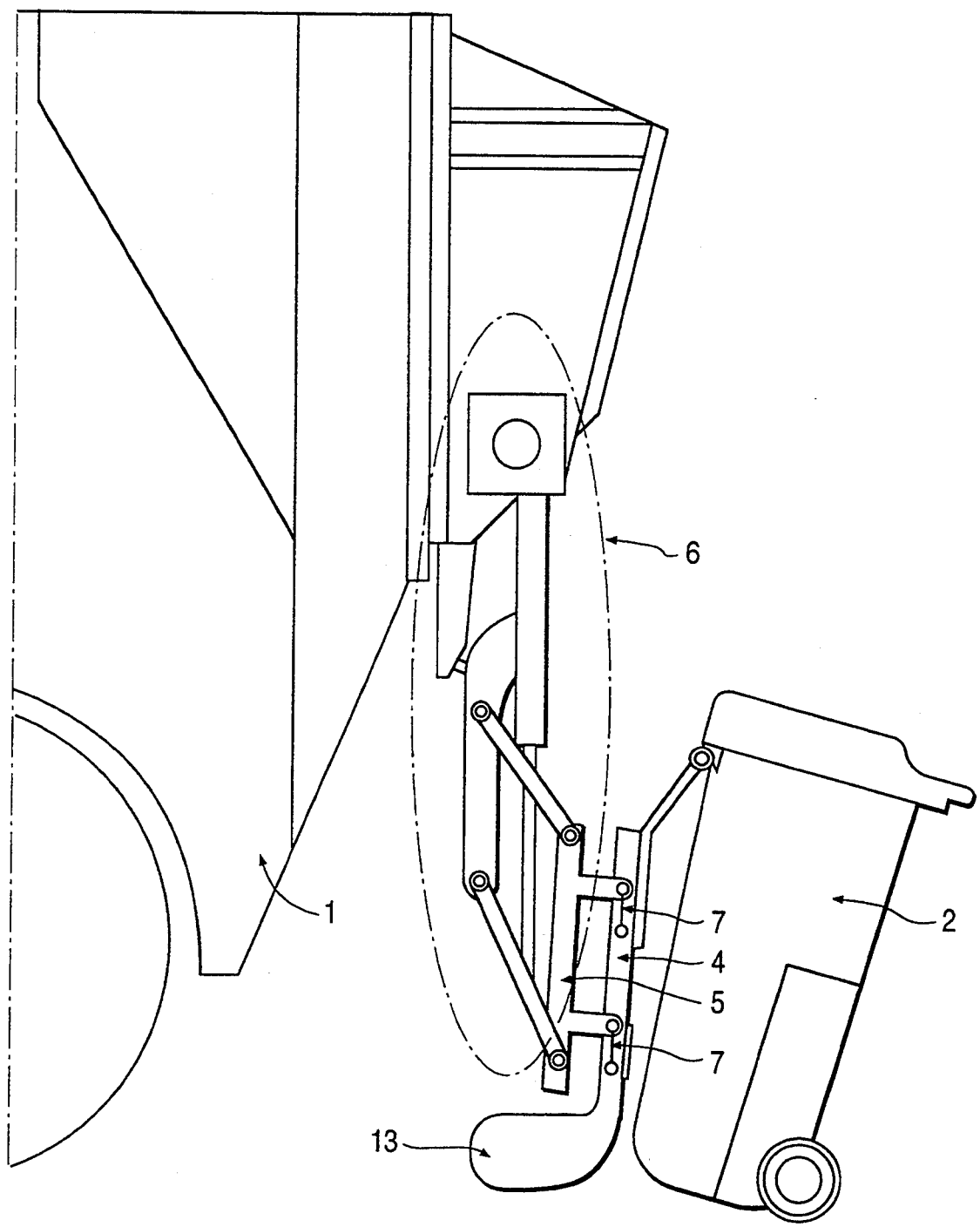

The embodiment according to FIG. 29C corresponds largely to that according to FIG. 29A. However, here the auxiliary frame 4 has been provided with a counterweight 13 by which the centre of gravity of the total load, that is, of the weight of the container 2 and of the auxiliary frame, is kept within the space of the lines of force going through the fastening points 71 of the coupling members 7.

Because of this, all coupling members 7 will be loaded in the normal direction and the lower coupling members will not be loaded in opposite direction such as the coupling members 8 in FIG. 29A.

Figure 30:
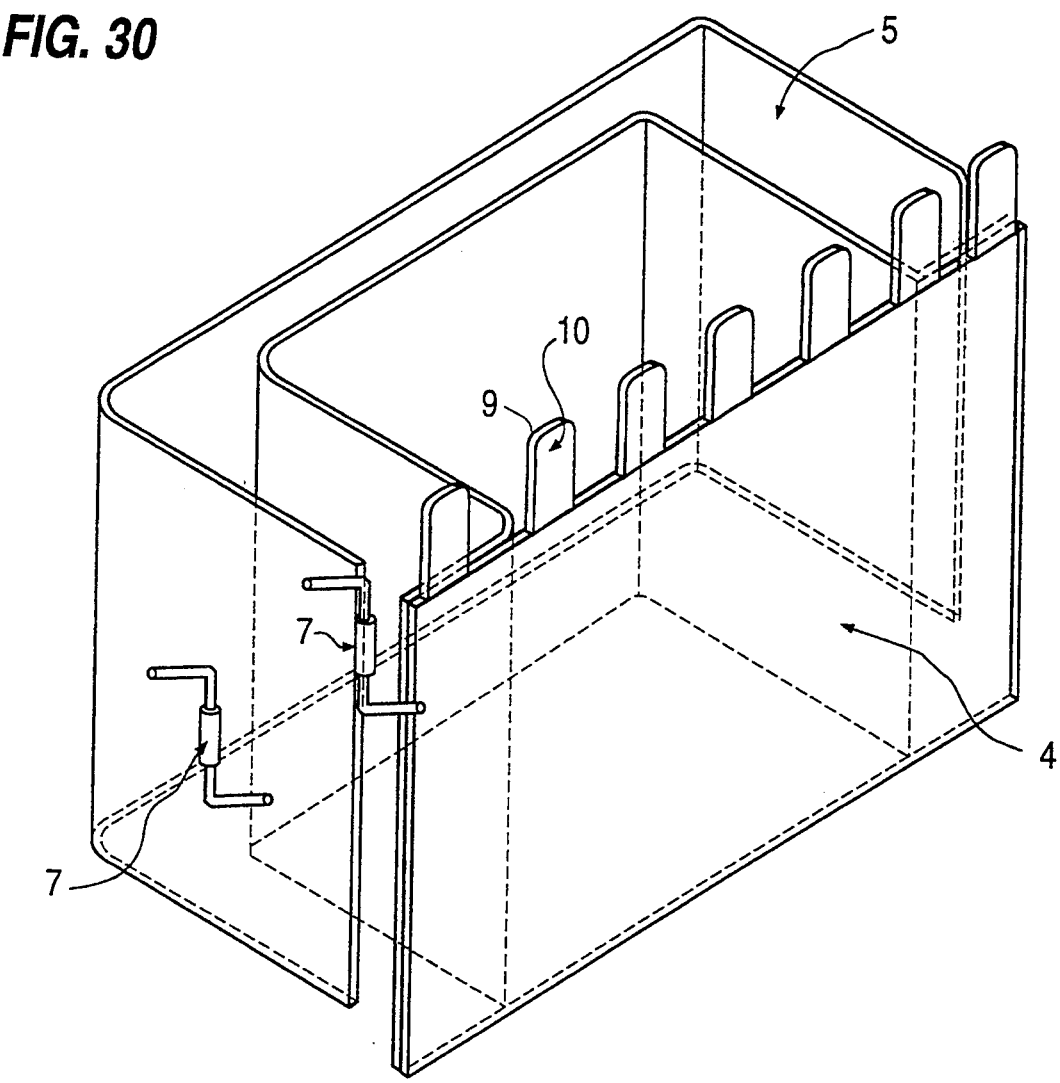
FIG. 30 diagrammatically shows a perspective view of a main frame and an auxiliary frame with the accompanying coupling members, as these can be applied with the embodiments according to the FIGS. 28 and 29.

FIG. 30 shows a perspective view of a main frame 5 with an auxiliary frame 4, which are connected with each other by means of the coupling members 7. The auxiliary frame 4 has been provided with the engaging members 9, which constitute the engaging points 10 for the container 2 not shown.

It will be obvious, that the system shown in FIG. 30 is applied in particular with the embodiment according to the FIGS. 28 and 29.

Figure 31:
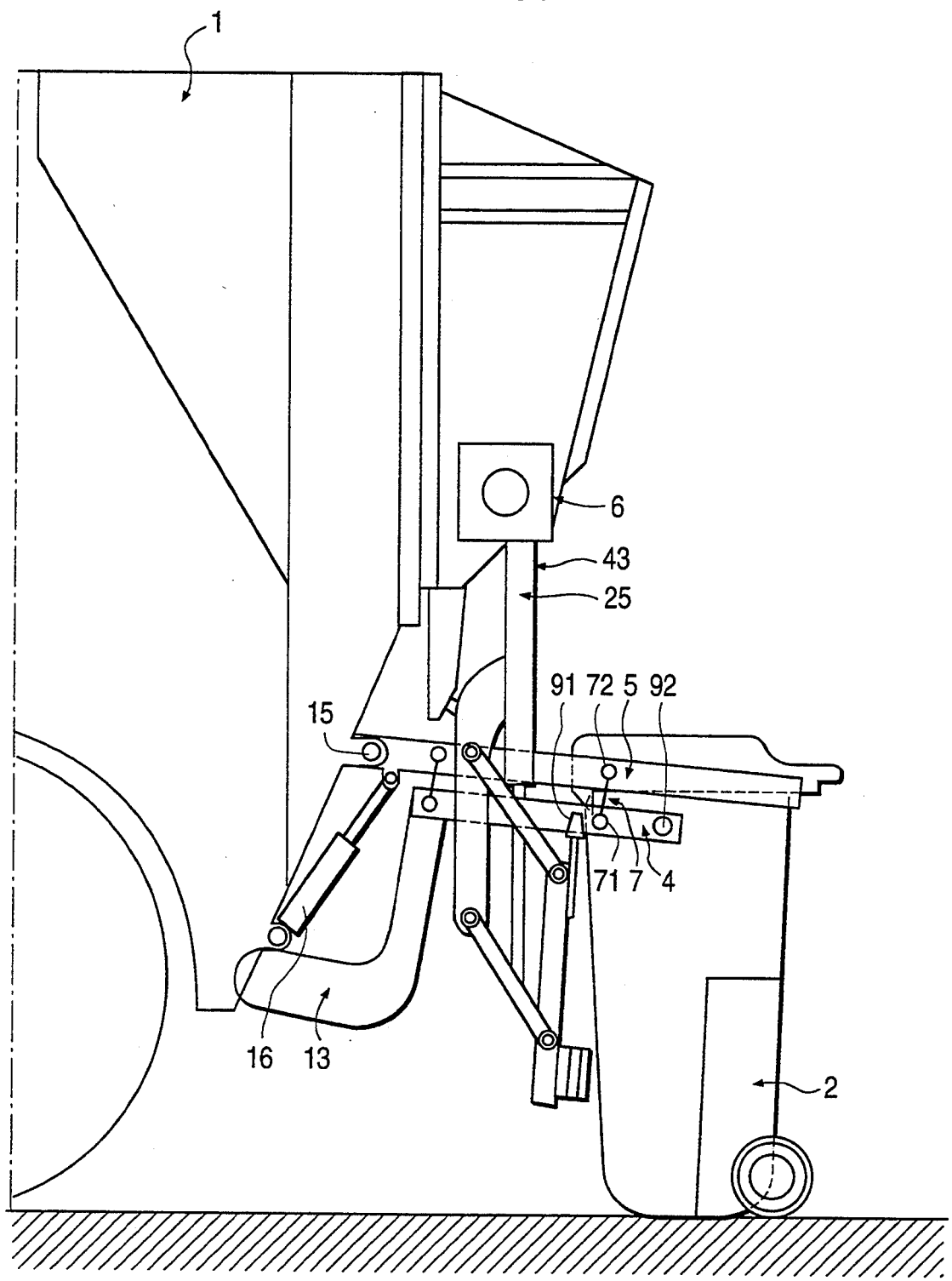
FIG. 31 diagrammatically shows a side view of still another embodiment.

FIG. 31 shows an embodiment in which the auxiliary frame 4 runs mainly horizontally and has been connected to the main frame 5 by means of the coupling members 7, suitable for determining the weight of the container 2 being suspended by said frame 4 in the points 92. The frame 4 has been provided with a counterweight 13 so that the centre of gravity of said frame whether or not together with the container 2 is always positioned in the space enclosed by the four vertical lines through the connecting points 71 and 72 of the coupling members 7. The axis of said coupling members 7 will always run vertically so that the weight of the elements supported on them will be determined accurately.

During determination of the weight there is no connection between the container and the tilting mechanism 43. Only after weighing the container is picked up from the frame 4 to be emptied by said tilting mechanism 43. The empty container is then brought back onto the frame 4 to be weighed once again, so that the weight of the garbage which has left the container can be determined.

It is possible to use means for locking the frame 4 in respect of the frame 5 as long as no weighing takes place.

I claim:

1. A tilting, lifting and weighing apparatus movably mounted to a truck body, said apparatus comprising:
   a container having sidewalls and a pair of attachment surfaces, each of said attachment surfaces being disposed on a respective opposed sidewall;
   a weighing and tilting mechanism including
      an auxiliary frame,
      a main frame,
      a pair of coupling members each including means for measuring load applied to said coupling members, each of said coupling members connecting said main frame to said auxiliary frame,
      a pair of engaging members each being engageable with a respective one of said attachment surfaces so that said container is supported by said engaging members, said engaging members being supported by said auxiliary frame,
      means for tilting said container; and
   means structurally connecting said truck body to said weighing and tilting mechanism, for lifting said weighing and tilting mechanism;
   wherein said load applied to said coupling members includes a total of a weight of said auxiliary frame and a weight of said container, and said coupling members connect said main frame to said auxiliary frame at points which lie outside of a vertical plane defined between said engaging members.

2. An apparatus according to claim 1, characterized in that the auxiliary frame consists of an almost rectangular frame provided with the engaging members on an outside portion thereof so that engaging members engage the container laterally.

3. An apparatus according to claim 2, characterized in that in a weighing position the rectangular auxiliary frame forms an angle of 0° to 45° with vertical plane.

4. An apparatus according to claim 1, characterized in that a center of gravity of the load is within or outside the plane between lines of force of the load produced by a weight of the load and going through connecting points between the coupling members and the auxiliary frame, at which a counterweight can be present for adjusting a position of the center of gravity.

5. An apparatus according to claim 1, characterized in that a center of gravity of the load is outside a space or the plane between lines of force of the load produced by the load and going through connecting points between the coupling members and the auxiliary frame such that a tilting tendency arises by action of a weight of the load supported in the connecting points being closest to the load between the coupling members and the auxiliary frame, and the tilting tendency being counteracted in other connecting points between oppositely directed coupling members and the auxiliary frame.

6. An apparatus according to claim 1, characterized in that all engaging points are almost in a straight line when the container is in a certain weighing position such that the container is only supported at the engaging points and is suspended and balanced at the engaging points.

7. An apparatus according to claim 6, characterized in that all the engaging points, all connecting points between coupling members and the auxiliary frame, and a center of gravity of the auxiliary frame are almost in one plane and wherein a force has to be measured in only some of the coupling members, the sum of the measured force always being proportional to the weight of the container.

8. An apparatus according to claim 6, characterized in that a center of gravity of the auxiliary frame, all the engaging points, and the connecting points of at least two coupling members with the auxiliary frame are almost in the straight line and the auxiliary frame is pivotable around a shaft having an axis which coincides with the straight line so that the auxiliary frame is movable between various positions in a weighable condition around said shaft and a force is exclusively measurable in selected ones of said coupling members for determining the weight of the container.

9. An apparatus according to claim 1, wherein said coupling members are oriented in a same direction.

10. An apparatus according to claim 1, wherein said weighing and tilting mechanism further comprises a tilting frame pivotally connected to said auxiliary frame, and
   wherein said engaging members are disposed on said tilting frame, and said tilting frame is operatively connected to said tilting means such that upon actuation of said tilting means said container and said tilting frame are tilted while said main frame and said auxiliary frame remain stationary.

11. An apparatus according to claim 10, wherein during tilting of said tilting frame, said tilting frame is supported by said main frame via said auxiliary frame.

12. An apparatus according to claim 10, wherein said tilting means includes a hydraulic cylinder which is separate from said lifting means and which connects said tilting frame to said auxiliary frame.

13. An apparatus according to claim 1, wherein said weighing and tilting mechanism further comprises a tilting frame having supplementary engaging members and being pivotally connected to said main frame, and wherein said tilting frame is movable along a tilting movement while said main frame and said auxiliary frame remain stationary and when said tilting frame moves along said tilting movement said supplementary engaging members engage said attachment surfaces of said container so that said container is carried with said tilting frame.

14. An apparatus according to claim 1, wherein said coupling members are flexible such that said coupling members flexibly connect said auxiliary frame to said main frame.

15. An apparatus according to claim 1, wherein said coupling members are connected to each of said auxiliary and main frames by a cardan-type connection so that said auxiliary frame and said main frame are flexibly connected to each other.

16. An apparatus according to claim 1, wherein said auxiliary frame is u-shaped and said engaging members are mounted at predetermined positions on an inside portion of the u-shape so that said engaging members engage said attachment surfaces laterally relative to said container.

17. An apparatus according to claim 16, characterized in that in a weighable position the u-shaped auxiliary frame forms an angle of 0° to 45° with a horizontal plane.

18. An apparatus according to claim 1, wherein said auxiliary frame and said main frame are substantially parallel to each other and are each oriented along a horizontal plane.

19. A tilting, lifting and weighing apparatus movably mounted to a truck body, said apparatus comprising:
a container having sidewalls and a pair of attachment surfaces, each of said attachment surfaces being disposed on a respective opposed sidewall;
a weighing and tilting mechanism including
an auxiliary frame,
a main frame,
a pair of coupling members each including means for measuring load applied to said coupling members, each of said coupling members connecting said main frame to said auxiliary frame,
a pair of engaging members each being engageable with a respective one of said attachment surfaces so that said container is supported by said engaging members, said engaging members being supported by said auxiliary frame,
means for tilting said container; and
means structurally connecting said truck body to said weighing and tilting mechanism, for lifting said weighing and tilting mechanism.

* * * * *